United States Patent [19]
Sato et al.

[11] Patent Number: 5,669,025
[45] Date of Patent: Sep. 16, 1997

[54] FILM PACK HOLDER

[75] Inventors: Tokuji Sato, Saitama; Hirokazu Ohno, Nagano, both of Japan

[73] Assignee: Fuji Photo Film Co., Ltd., Kanagawa, Japan

[21] Appl. No.: 632,392

[22] Filed: Apr. 10, 1996

[30] Foreign Application Priority Data

Apr. 13, 1995 [JP] Japan .................................. 7-088064
Aug. 25, 1995 [JP] Japan .................................. 7-217396

[51] Int. Cl.$^6$ ........................ G03B 19/10; G03B 17/26
[52] U.S. Cl. ........................ 396/360; 396/366; 396/517
[58] Field of Search ..................... 354/174, 176, 354/180, 181, 217, 276, 283; 396/360, 366, 517

[56] References Cited

U.S. PATENT DOCUMENTS

| | | | |
|---|---|---|---|
| 4,348,086 | 9/1982 | Forscher | 354/83 |
| 4,392,731 | 7/1983 | Van Heyningen | 354/180 |
| 4,492,445 | 1/1985 | Norris | 354/180 |
| 4,788,566 | 11/1988 | Koch | 354/283 |

FOREIGN PATENT DOCUMENTS 5-341381  12/1993  Japan .

*Primary Examiner*—Michael L. Gellner
*Assistant Examiner*—Daniel Chapik
*Attorney, Agent, or Firm*—Young & Thompson

[57] ABSTRACT

A stopper piece of a regulating member is abutted against a receiving portion formed at a lever of a display mechanism. The stopper is biased in a regulating direction by the force of a torsion coil spring. A projecting piece is abutted against a lever of a releasing member so that the stopper piece can be kept at a position where the rotation of the lever is regulated. The lever of the releasing member is supported in such a manner to move back and forth freely, and is held at the position where the rotation of the lever is regulated before a film pack is set. A trigger plate is formed at the lever. When a pack main body is set at a final position, the trigger plate is pushed by a pack main body and move. When the trigger plate is moved, the lever pushes a lock lever so that the regulation of the lever's rotation by the stopper can be released.

7 Claims, 26 Drawing Sheets

FILM PACK HOLDER

BACKGROUND OF THE INVENTION

1. Field of the Invention

The present invention relates to a film pack holder and more particularly to a film pack holder in which a film pack, wherein a plurality of sheet film units are piled and housed, is set.

2. Description of the Related Art

There is a film pack holder which is disclosed in a Japanese Patent Application Laid-open No. 5-341381. The film pack holder is set in an exposure frame of a large-format camera after the lid of the film pack holder is opened and a film pack is set in a slide frame within a main body of a holder. At the time of photographing, a slide of the film pack is pulled out, and the first sheet film unit is exposed via an exposure opening of the lid.

A display mechanism is provided in the film pack holder so as to display a mark indicating that a preparation for photographing is completed. The display mechanism has a nail which is engaged with the slide of the film pack 1. The nail is moved in connection with the opening and closing of the slide, so that the mark can be displayed.

Furthermore, a pair of nails are provided at the main body of the holder and the lid in order to lock the main body of the holder and the lid when the lid is closed. The pair of nails provided at the lid is formed at both ends of the plate-shaped nail main body, which is arranged at the lid in such a manner to move back and forth freely. The nail main body is moved by the pressure from the knob, which is provided at the center against the force of the torsion coil spring in a direction in that the lock is released.

However, there is a problem when a hand touches the nail portion in the display mechanism and moves the nail portion carelessly. When the film pack is set after the hand touches the nail portion, the mark indicating the completion of the photographing preparation is displayed even if the preparation has not been completed yet. As a result, the photographer starts the photographing by mistake.

Furthermore, the film pack holder is unstable because the nail main body is supported by only one torsion coil spring. Therefore, when the knob is pressed, the nail main body shakes with the attachment portion of the torsion coil spring being a center. So, there is a problem in that the nail main body does not move back and forth smoothly and the lock cannot be released.

SUMMARY OF THE INVENTION

The present invention has been developed in view of the above-described circumstances, and has the objective for the provision of a film pack holder which prevents errors in operation of a display mechanism indicating that a preparation for photographing is completed, and which smoothly releases the lock of a lid and a main body of a holder.

To achieve the above-mentioned objective, the present invention comprises: the main body of the holder; a lid which is attached at the main body of the holder in such a manner to move back and forth freely and wherein an opening for photographing is formed; a film pack wherein a slide is attached in such a manner to move back and forth freely and which shields sheet film units which are laminated to be stored therein from light when the slide is closed; a slide frame which is incorporated in the main body of the holder and is provided in such a manner to slide freely with respect to the main body of the holder; a nail portion which is provided at the main body of the holder and which is engaged with the slide when the slide is opened and closed; a display mechanism provided in the main body of the holder for indicating that a preparation for photographing is completed in connection with the movement of the nail portion; a regulating member which is abutted against the nail portion for regulating the movement of the nail portion before the film pack is set; a regulating releasing member which is pushed by the film pack to retract the regulating member from the nail portion and releases the regulation by the regulating member when the film pack is set.

According to the present invention, the movement of the nail portion in the display mechanism is regulated by the regulating member in a state that the film pack is not set in the slide frame, so the nail portion does not move even if the hand touches the nail. When the film pack is set in the slide frame, the regulating releasing member is pushed by the film pack so that the regulating member can be retracted from the nail portion. As a result, the regulation of the movement of the nail portion by the regulating member is released.

Furthermore, to achieve the above-described objects, the present invention comprises; a main body of a holder into which a film pack storing sheet film units therein is incorporated; a lid which is attached on a top surface of the main body of the holder in such a manner to open and close freely and wherein an opening for photographing is formed on a surface thereof; a pair of nail members which are provided at the main body of the holder and the lid and are engaged with each other for locking the main body of the holder and the lid when the lid is closed; a nail main body which is arranged at the main body of the holder and the lid in such a manner to move back and forth freely wherein one of the nail members is formed at both ends thereof; a pair of pressing members which are provided on both sides across the center of the nail main body for pressing one of the nail members in a direction in that the nail member is engaged with the other nail member; and a knob which is provided at the center of the nail main body, and is pressed to move the nail main body against the force of the pressing member in a direction in that the engagement of one nail member of the other nail member is released.

According to the present invention, when the knob of the nail main body is pressed, the nail main body moves smoothly against the pressure from a pair of pressing member provided on both sides across the center of the nail main body in a direction in that the engagement of one nail member and the other nail member is released. Thus, the engagement of one nail member and the other nail member is released, and the lock of the main body of the holder and the lid is released smoothly.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE PREFERRED EMBODIMENT

Figure 1:
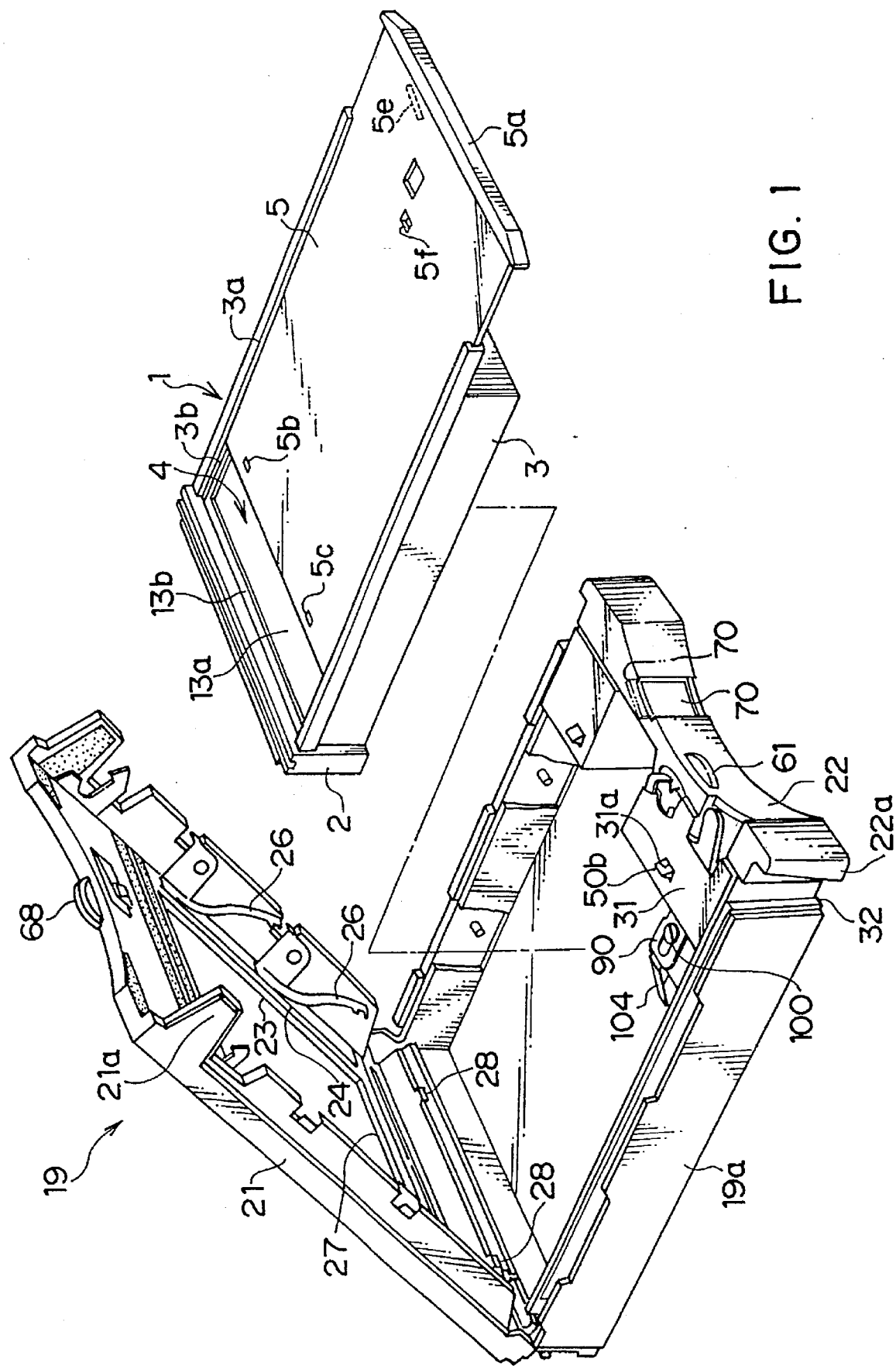
FIG. 1 is a perspective view of a film pack holder and a film pack according to the first embodiment of the present invention.
Figure 2:
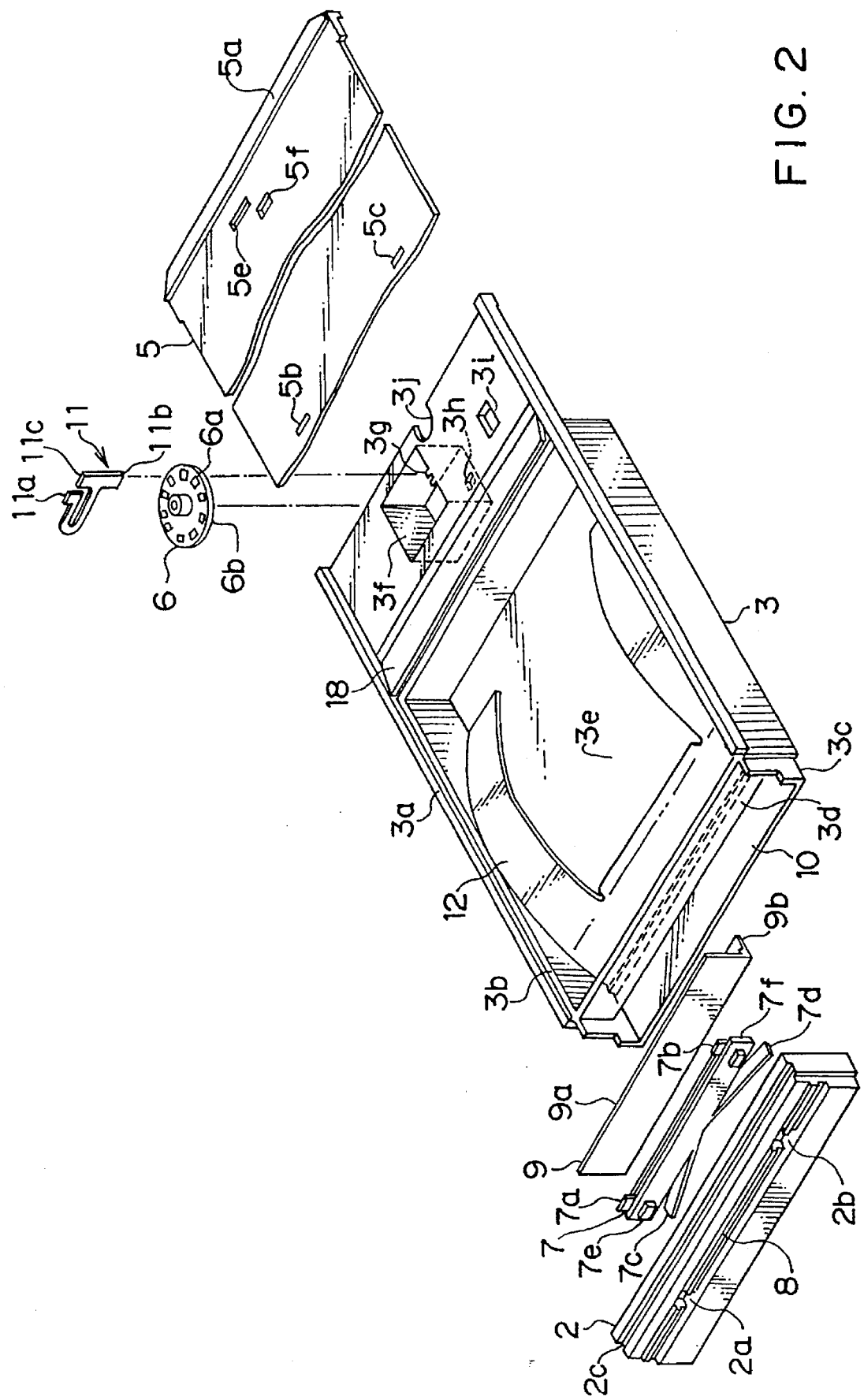
FIG. 2 is an exploded perspective view of the film pack.

FIG. 1 is a perspective view illustrating the first embodiment of a film pack holder according to the present invention. First, an explanation will be given of a film pack which is set in the film pack holder of the present invention. As shown in FIGS. 1 and 2, the film pack 1 is provided with a box-shaped pack main body 3 having at its forward end a cap 2 which is freely attached or removed, a plurality of sheet film units 4 which are piled and stored in the pack main body 3, a slide 5 with a hand 5a for opening and closing an opening 3a formed at an end portion close to the hand 5a of the pack 3, and a disk-shaped counter plate 6 for displaying the number of photographed sheet film units 4. The slide 5 is larger than the sheet film unit 4. The hand 5a is opened and closed after the film pack 1 is placed in the film pack holder, so that the slide 5 can be moved along a groove 3b formed on an inner surface of a side wall of the pack main body 3.

The cap 2 contains a nail member 7 as shown in FIG. 2. Nails 7a and 7b are formed at the nail member 7. These nails are engaged with engagement holes 5b and 5c, which are formed close to the forward end of the slide 5. The spring portions 7c and 7d are formed at the lower part of the nail member 7. The nail member 7 is pressed towards the slide 5 by the spring portions 7c and 7d at all times. Projections 7e and 7f are formed in a perpendicular direction to the nails 7a and 7b. The projections 7e and 7f are projected from openings 2a and 2b of the cap 2 towards the outside. The openings 2a and 2b are widely opened in a direction in which the nail member 7 moves. A length, in which the projections 7e and 7f projects from the openings 2a and 2b, equals to a height of a wide projection 8, which is provided on both sides of the openings 2a and 2b, so as to prevent the projections 7e and 7f from being pushed down carelessly.

When the film pack 1 is set in the film pack holder, the projections 7e and 7f are pushed down by a projecting portion of the film pack holder, which will be described later. As a result, the nails 7a and 7b are removed from the engagement holes 5b and 5c, with which the nails 7a and 7b are engaged. A groove portion 2c is formed at an upper part of the cap 2. When the film pack 1 is set in the film pack holder, the projecting part of the film pack holder is engaged with the groove part 2c, so that the cap 2 can stay in the film pack holder in a state of being engaged with the film pack holder. Incidentally, a number 9 indicates a L-formed plate, which is composed of a lid portion 9a for sealing the nail member in the cap 2, and a receiving portion 9b for receiving an end portion of the photographed sheet film unit 4. However, a space is provided at the upper part of the plate 9 so that the forward end of the slide 5 can be inserted into the cap 2. Spaces are also provided at the lower, right and left parts so that a forward end portion 3c of the pack main body 3 can be inserted into the cap 2. A partition 3d is provided inside the forward end portion 3c for regulating an end position of the sheet film unit 4 with a space formed between itself and an inner wall 3e of a back surface of the pack main body 3. The space is an opening 10 for receiving the photographed sheet film unit 4.

The counter plate 6 is housed in a box-shaped storage chamber 3f so as to freely rotate. A press plate 1, in which a spring portion is formed, is guided by a guide grove 3g of the chamber 3f and is provided on the counter plate 6. Because a spring portion end 11a of the pressing plate 11 is regulated to be on an inner surface of the wall of the slide 5, a bottom end 11b of the pressing plate 11 is always engaged with reverse prevention nails 6a, 6a. . . , which are formed on an peripheral surface of the counter plate 6. Numbers, which indicate the number of pictures such as "1", "2", "3". . . "7", are carved one by one on a back surface of the aforementioned reverse prevention nails 6a, 6a. . . . A height of the reverse prevention nails 6a, 6a. . . is all the same; however, a teeth portion corresponding to an end mark "E" is higher than the other portions, and a top surface of the teeth portion is flat. Thus, while the photographing is being performed, a top end 11c of the pressing plate 1 is held at a predetermined distance from the inner surface of the slide 5.

However, after the last sheet film unit is photographed, the bottom end 11b of the pressing plate 11 is pushed by a tooth 6a corresponding to the end mark "E", so that the pressing plate 11 goes up to be engaged with the engagement hole 5f of the slide 5. Thus, the slide 5 is locked in the pack main body 3 so as not to be pulled out.

A tooth 6b (see FIG. 4) is formed at a peripheral end portion of the counter plate 6. A later-described counter feed nail is engaged with the tooth 6b so that the counter plate 6 can move in only one direction. The tooth 6b is bent towards one side. When returned to its former state, the counter feed nail is prevented from being engaged with the tooth 6b. The above-mentioned numbers "1", "2", "3"... "7" and the mark "E" are carved on the back surface of the nail 6a of the counter plate 6. A window for observing the numbers and the mark is formed at the bottom of the storage chamber 3f. A hole 3i is formed near the storage chamber 3f of the pack main body 3. A later-described nail portion of the latch mechanism, which is provided in the slide frame, projects from the hold 3i, and the nail portion is engaged with the engagement hold 5c so as to regulate a range wherein the slide 5 is pulled out. A mark 3j is a cut piece, into which a later-described projection of the slide 5 is inserted.

A step 5d (see FIGS. 3 and 5) is formed on the hand 5a side of the bottom surface of the slide 5. The step 5d is engaged with the end portion of the pack main body 3 so as to prevent the slide 5 from moving towards the cap 2. Thus, the cap 2 is not removed from the pack main body 3 in a state that a forward end portion of the slide 5 is connected with the cap 2 by the nail member 7.

As shown in FIG. 1, the sheet film unit 4 is composed of a sheet film 13a of 4×5 inch, and a thin-sheet shaped sheath 13b such as a metal piece, which supports the base surface of the sheet film 13a and wherein three dimensions are bent so as to enclose three dimensions of the sheet film 13a. Incidentally, if the sheet film unit 13a is kept flat, and there is sufficient strength, the sheath 13b can be made of plastic.

Figure 3:
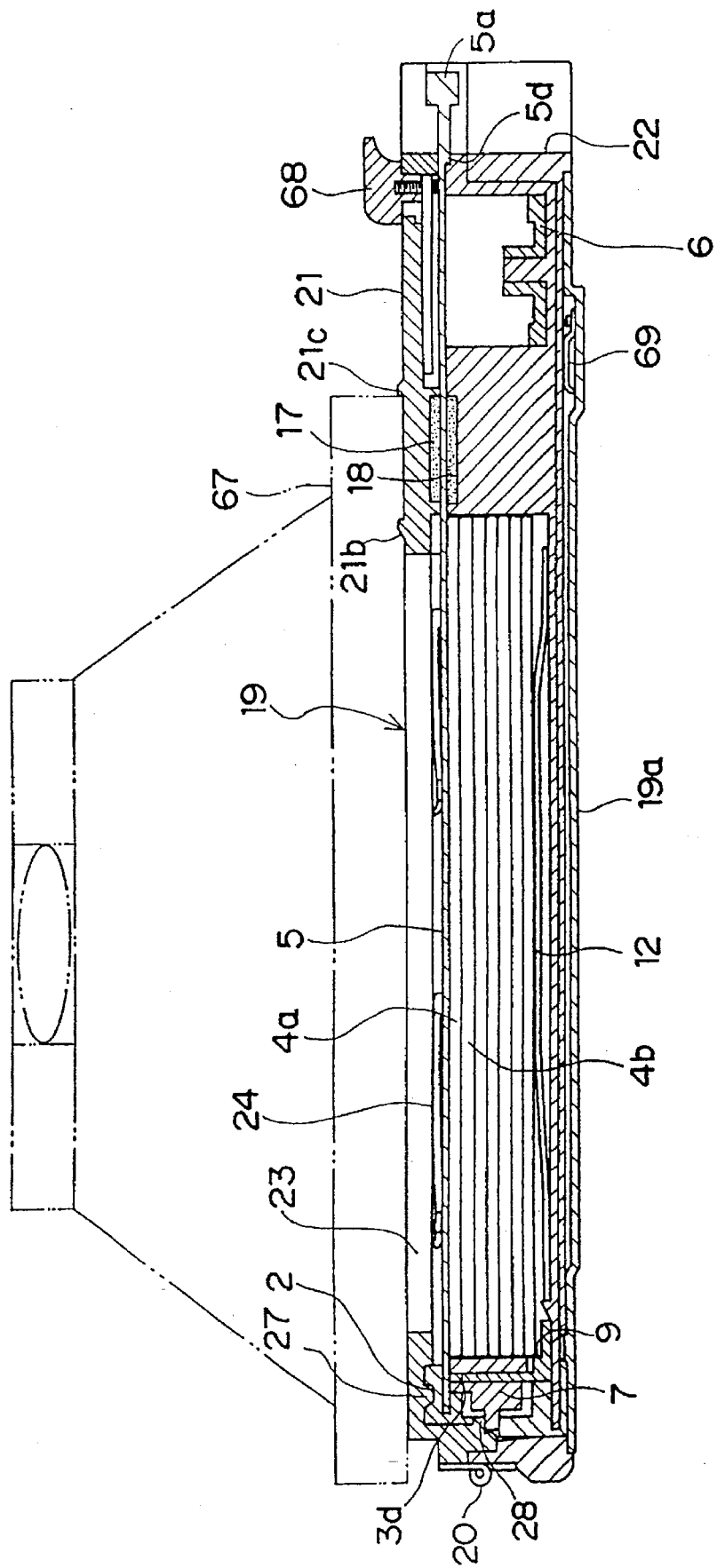
FIG. 3 is a cross-sectional view of the film pack holder and the film pack at an initial position.

As shown in FIG. 3, for example, 7 sheet film units 4, 4 ... are piled in order to be stored in the pack main body 3. The sheet film units 4, 4 ... are pressed against a front surface side (upwardly in FIG. 2) by a plate spring 12, of which one end is fixed on the back surface inner wall of the pack main body 3. Thus, the sheet film unit 4 is pressed in order to be fixed on the back surface of the slide 5. Incidentally, marks 17 and 18 indicate light-shielding cloths, which prevent the external light from entering a space between a slide surface, on which the slide 5 is moved back and forth, and the slide 5.

As shown in FIG. 1, the film pack holder 19 according to the embodiment of the present invention comprises a main body of a holder 19a, a lid 21 which is attached on a top surface of the main body of the holder 19a so as to be freely opened and closed, and a tray-shaped slide frame 22 which is provided in the main body of the holder 19 so as to slide. A photographing opening 23 smaller than the sheet film unit 4 is formed on a surface of the lid 21. A receiving surface 24 is formed at an external periphery of the photographing opening 23, and the top surface periphery of the sheet film unit 4 is abutted against the receiving surface 24 so that the sheet film unit 4 can be held at a photographing position.

Plate springs 26, 26 ... are provided inside both side walls and extended in a longitudinal direction of the lid 21. The plate spring 26 presses the pack main body 3 downwardly as shown in the drawing when the film pack 1 is set in the film pack holder 19 and the lid 21 is closed. The plate spring 26 also presses the sheet film unit 4, which is discharged from the pack main body 3, from the top. A projection 27 is formed near a hinge 20 of the lid 21 as shown in FIG. 3, and a pair of projecting portions 28 are formed at the projection 27. When the lid 21 is closed, the projection 27 is engaged with the groove portion 2c of the cap 2 so as to hold the cap 2 within the film pack holder 19. The projecting portions 28 push down the projections 7e and 7f of the nail member 7, and removes the nails 7a and 7f from the engagement holes 5b and 5c of the slide 5, so as to release the engagement of the cap 2 and the slide 5.

A latch mechanism for controlling a slide movement of the slide frame from and to the main body of the holder 19a, a counter feed mechanism for moving the counter plate 6, a regulating member for regulating the operations of the latch mechanism and the counter feed mechanism, and a regulating releasing member for releasing the regulation by the regulating member are built in a box portion 31 provided at the slide frame 22 of FIG. 1. The regulating member regulates a movement of a later-described display mechanism, and the regulating releasing member releases the regulating member.

Figure 4:
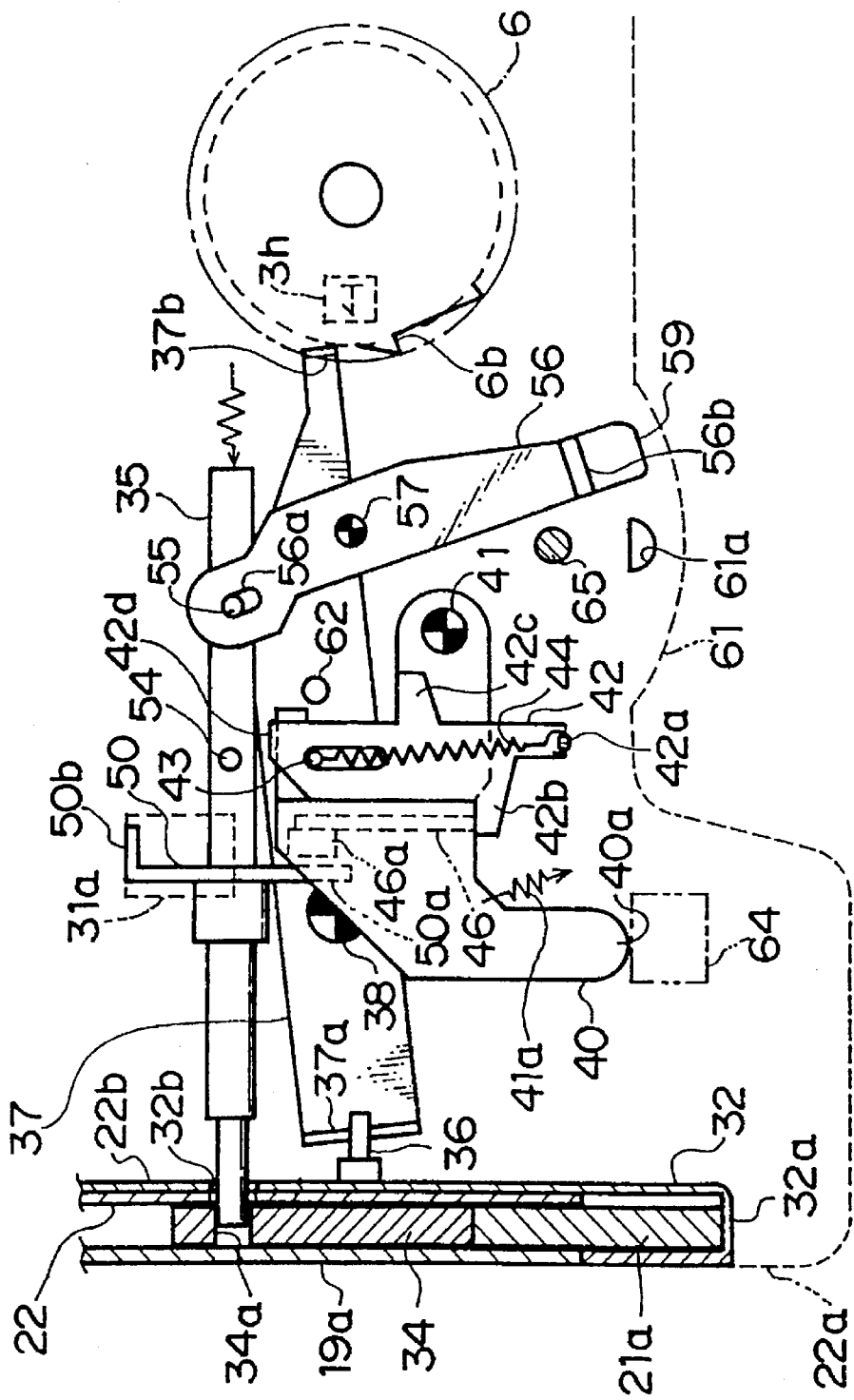
FIG. 4 is an enlarged plane view showing an initial position of a structure of a latch mechanism and a counter feed mechanism.
Figure 5:
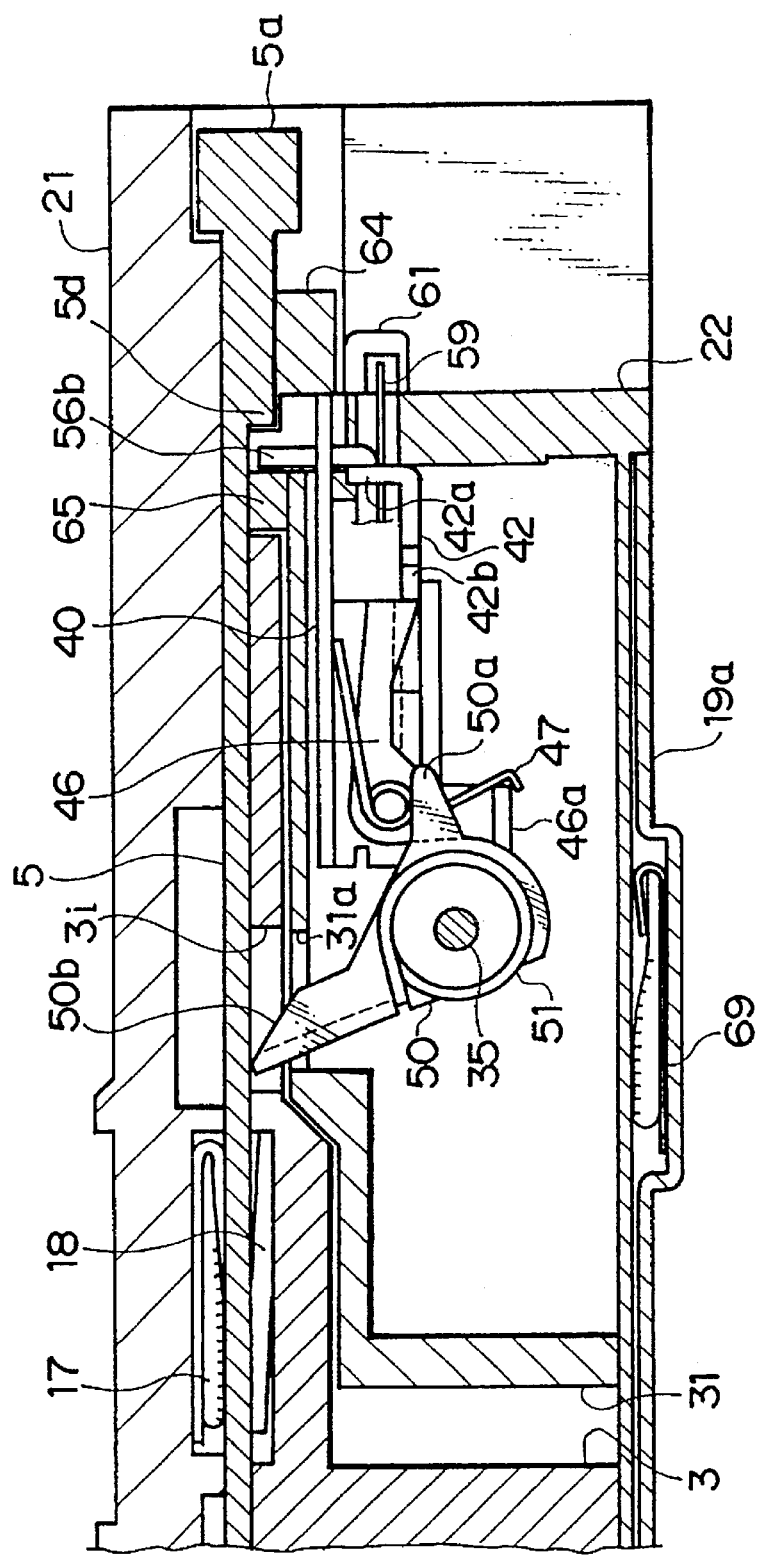
FIG. 5 is a enlarged cross-sectional view of the latch mechanism at its initial position.

An explanation will hereunder be given of the structure of the latch mechanism and the counter feed mechanism with reference to FIGS. 4 and 5. A flat lever 32 is provided on one longitudinal inner wall of the slide frame 22 so as to freely slide. The lever 32 has a bending portion 32a at its forward end. A position of the bending portion 32a is regulated between a leg portion 21a of the lid 21 and a front end portion 22a of the slide frame 22 at an initial position as shown in FIG. 4 (in a state just after the film pack 1 is set in the film pack holder 19).

Holes 22b, 32b and 34a are formed on a plate 34, which is fixed on an inner wall of the slide frame 22, the lever 32 and the main body of the holder 19a. These holes are formed in a straight line at an initial position in FIG. 4. A round stick shaped lever 35, which is forced towards the plate 34 by a spring, is inserted into the holes 22b, 32b and 34a. The slide frame 22 and the lever 32 are engaged with the main body of the holder 19a and are held in this state. A pin 36 is secured to the lever 32. A counter feed lever 37, of which one end portion 37a is engaged with the pin 36 is provided around an axis 38 so as to freely rotate. The other end portion of the counter feed lever 37 is a counter feed nail 37b, which drives the tooth 6b of the counter display plate 6 so as to move the counter display plate 6.

A lever 40 is arranged above the counter feed lever 37 and around an axis 41 in such a manner to rotate freely. The lever 40 is forced counterclockwise in the drawing by a spring 41A. The lever 40 is bent substantially at the central part thereof, and a step portion is formed there as shown in FIG. 4. A lever 42 is provided on the step in such a manner to slide freely. The lever 42 is forced upwardly in FIG. 4 by a spring 44, which is stretched from the pin 43 on the lever 42 to an end portion 42a of the lever 42. As shown in FIG. 5, an engagement 46 is arranged on the back of the lever 40. The engagement lever 46 is supported by a pin 45 in such a manner to rotate freely, and is forced clockwise by a spring 47. The engagement lever 46 is engaged with a nail portion 42b of the lever 42 and stops the lever 42 at its original position. A receiving portion 46a is formed at an end portion of the engagement lever 46 so as to be perpendicular to the engagement lever 46. When the receiving portion 46a is pressed down by a projection 50a of the lever 50, the engagement lever 46 is rotated counterclockwise so that the lock of the lever 42 can be released.

A lever 50 is inserted into a lever 35, and is forced clockwise by a spring 51. A nail portion 50b of the lever 50 projects from the hold 31a of the box portion 31. The nail portion 50b as shown in FIG. 1. When the film pack 1 is set in the film pack holder 19, the nail portion 50b is abutted against the back surface of the slide 5 via the hole 3i of the pack main body 3. Then, the nail portion 50b is engaged with the engagement hole 5c when the opening 3a is fully opened (see FIG. 6), so as to regulate a range in which the slide 5 is pulled out. The slide 5 is continuously pulled out so that the nail portion 50b can be rotated clockwise.

As shown in FIG. 4, two pins 54 and 55 are provided at the lever 35. The pin 55 is connected with a lever 56, which composes a display mechanism, via a long hole 56a. The lever 56 is attached on an axis 57 so as to rotate freely, and has a bending portion 56 at a forward end thereof. A cut piece 59, which is colored red, for example, and is a mark indicating a completion of a preparation for photographing, is fixed at a lower part of the bending portion 56b. The cut piece 59 appears in a window 61a of an arc projection (see FIG. 1), which projects at the center of the front end of the slide frame 22, so that the photographer can know that the preparation for photographing is completed.

A pin 62 is provided at an upper part of the counter feed lever 37. When the lever 37 is rotated in order to prepare for feeding the counter, the pin 62 is engaged with the nail portion 42c of the lever 42, so that the lever 42 can return to its original position. A forward end nail 42d of the lever 42 is engaged with the pin 54 when the preparation for photographing is completed, so that the lever 35 can move to the right side in the drawing, and the pin 54 can be pulled out of the holes 22b, 32b and 34a. Marks 64a and 65 are projections which are integrated with the bottom surface of the slide 5. The projection 64 presses an end portion 40a of the lever 40 to rotate the lever 40 when the slide 5, which was pulled out once, is returned to its former state. The projection 65 is engaged with the bending portion 56b after the preparation for photographing is completed. Thus, the slide 5 is integrated with the slide frame 22 so they can be pulled out of the main body of the holder 19a.

As shown in FIG. 3, the film pack holder 19 is arranged in such a manner that the lid 21, in which a photographing opening 23 is formed, is secured to an exposure frame 67. Convex portions 21b and 21c for positioning the exposure frame 67 are formed on a top surface of the lid 21. Number 68 indicates a knob which is operated when the lid is opened. Number 69 is a light-shielding cloth, which prevents a light from entering a space between a slide surface, on which the slide frame 22 is moved back and forth, and an inner wall surface of the main body of the holder 19a. Further, in FIG. 1, number 70 indicates a slide lock piece. When the slide lock piece 70 is moved manually, a top end portion of the slide lock piece is engaged with a groove 5e of the slide 5. Therefore, if the film pack is carried in such a state that the film pack is set in the film pack holder. Incidentally, a window (not shown) for watching the number of shots is formed at a position, which corresponds to a counter display window 3h, in the main body of the holder 19a and the slide frame 22.

Figure 7:
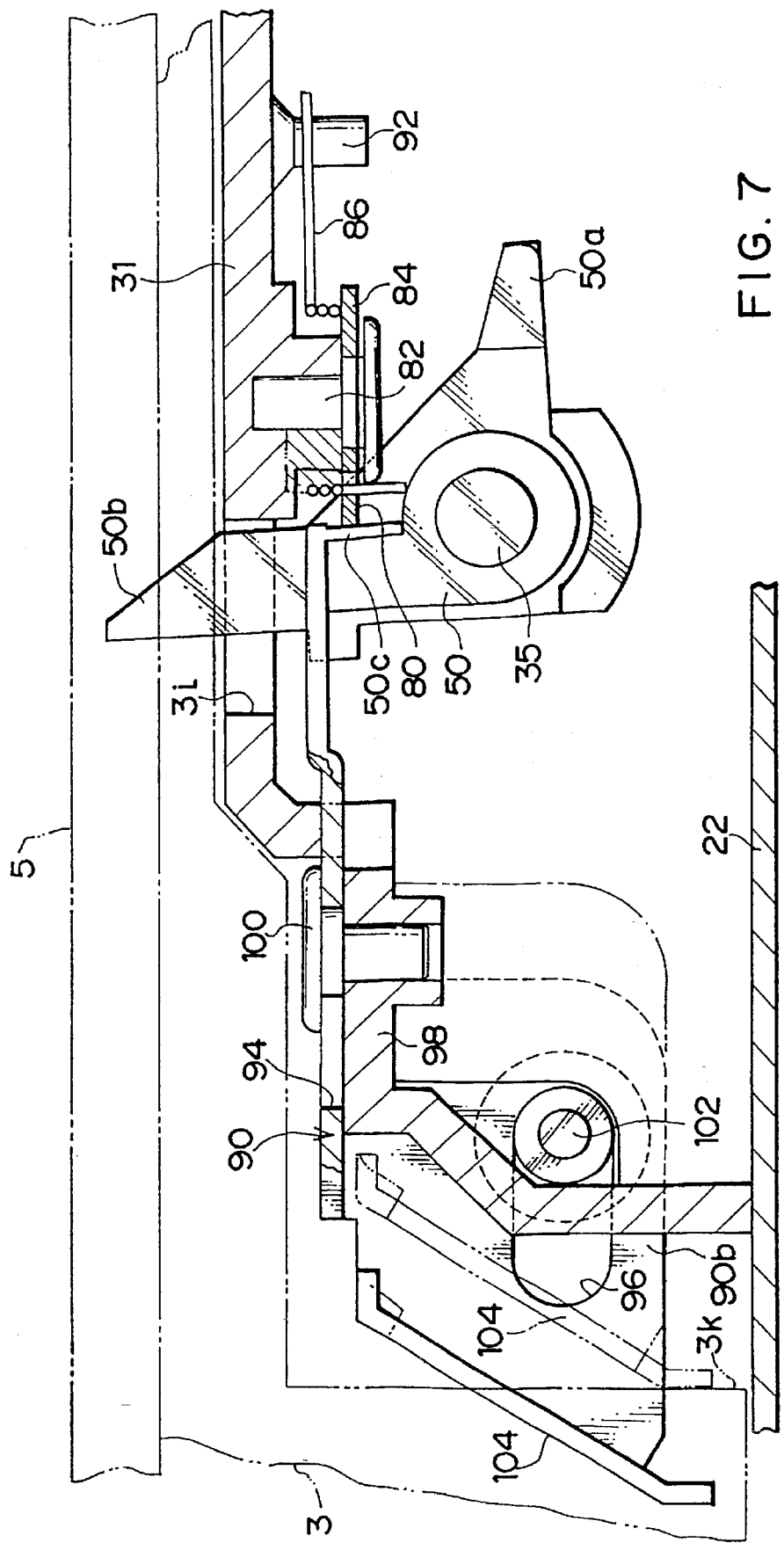
FIG. 7 is an enlarged cross-sectional view of a regulating member and a regulating releasing member of the latch mechanism the counter feed mechanism.
Figure 8:
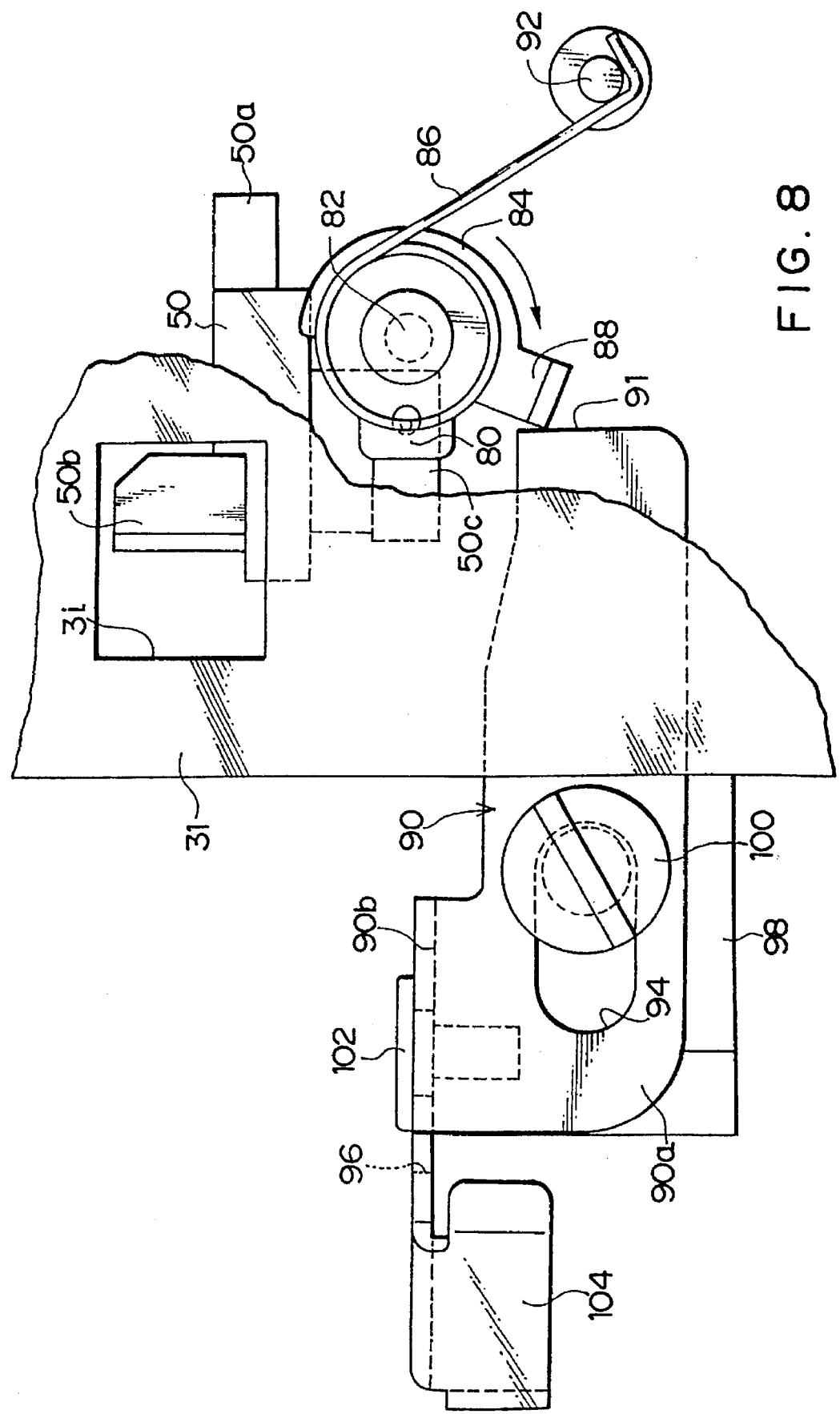
FIG. 8 is a top view of the regulating member and the regulating releasing member.

The regulating member of the display mechanism has a stopper 80 as shown in FIG. 7 and FIG. 8. The stopper 80 is abutted against the receiving portion 50c formed at the lever 50. The stopper 80 regulates the rotation of the lever 50 in a clockwise direction in FIG. 7. The stopper 80 is integrated with a lock lever 84, which is supported by the box portion 31 via a pin 82 so as to rotate freely. The lock lever 84 is forced clockwise in the drawing by a torsion spring 86. A projecting piece 88, which is integrated with the lock lever 84, is pressed and abutted against a right end portion 91 of a later-described lever 90, which is a regulating releasing member. Therefore, the lock lever 84 is held at a position as shown in FIG. 8, that is, a position where the stopper 80 regulates the rotation of the lever 50. One end of the torsion spring 86 is engaged with the lock lever 84 and stops in this state, and the other end is engaged with a pin 92, which is provided in the box portion 31.

On the other hand, the regulating releasing member of the display mechanism has the lever 90 as shown in FIGS. 7 and 8. As shown in FIG. 1, the lever 90 is arranged in a longitudinal direction of the slide frame 22. A slot 94 is formed in a longitudinal direction on a top surface 90a of the lever 90 as shown in FIGS. 7 and 8. Another slot 96 is formed in a longitudinal direction on a side surface 90b of the lever 90. The lever 90 is placed on a support plate 98 which is connected to the box portion 31. The slot 94 is supported by a pin 100, which is provided on the support plate 98 in such a manner to move back and forth freely. The slot 96 is supported by a pin 102, which is provided on a side surface of the support plate 98, in such a manner to move back and forth freely. Thus, the lever 90 is supported in a longitudinal direction of the slide frame 22 by the slots 94 and 96 and the pins 100 and 102 in such a manner to slide freely, and a range wherein the lever 90 is moved is regulated. Furthermore, the pressure of the torsion spring 86 is transmitted to the lever 84 and the projecting piece 88, so that the lever 90 can be pressed to the left in FIG. 8. Thus, before the film pack 1 is set in the slide frame 22, the right end portions of the slots 94 and 96 are abutted against the pins 100 and 102, respectively, so that the lever 90 can be held at a position which is shown in FIG. 8.

A trigger 104 is integrated with a left end portion of the lever 90. The trigger 104 is arranged in a downward direction at the bottom of the slide frame 22, and the surface of the trigger 104 is tapered in a lower left direction in the drawing. When the pack main body 3 is set at its final position, the trigger 104 is pushed by an edge portion 3k at the bottom of the pack main body 3 to be moved in a righthand direction as shown with a two-dot chain line in FIG. 7. Thus, the lever 90 moves in the righthand direction in FIG. 8, and the right end portion 91 of the lever 90 pushes the projecting piece 88, so that the stopper 80 retracts from the receiving portion 50c of the lever 50.

Next, an explanation will hereunder be given of the film pack holder 19 which is constructed in the above-mentioned manner.

Before the film pack 1 is set in the film pack holder 19, and if the lid 21 is opened, the nail portion 50b of the lever 50 projects from the hole 31a of the box 31, so the operator's hand touches the nail portion 50b of the lever 50 carelessly. In this embodiment, if the hand touches the nail portion 50b, the latch mechanism and the counter feed mechanism do not work. Therefore, when the film pack is set in the film pack holder 19, the piece 59 of the lever 56 (see FIG. 4), which is a display mechanism, does not appear in a window 61a of an arc projection 61 (see FIG. 1).

Figure 9:
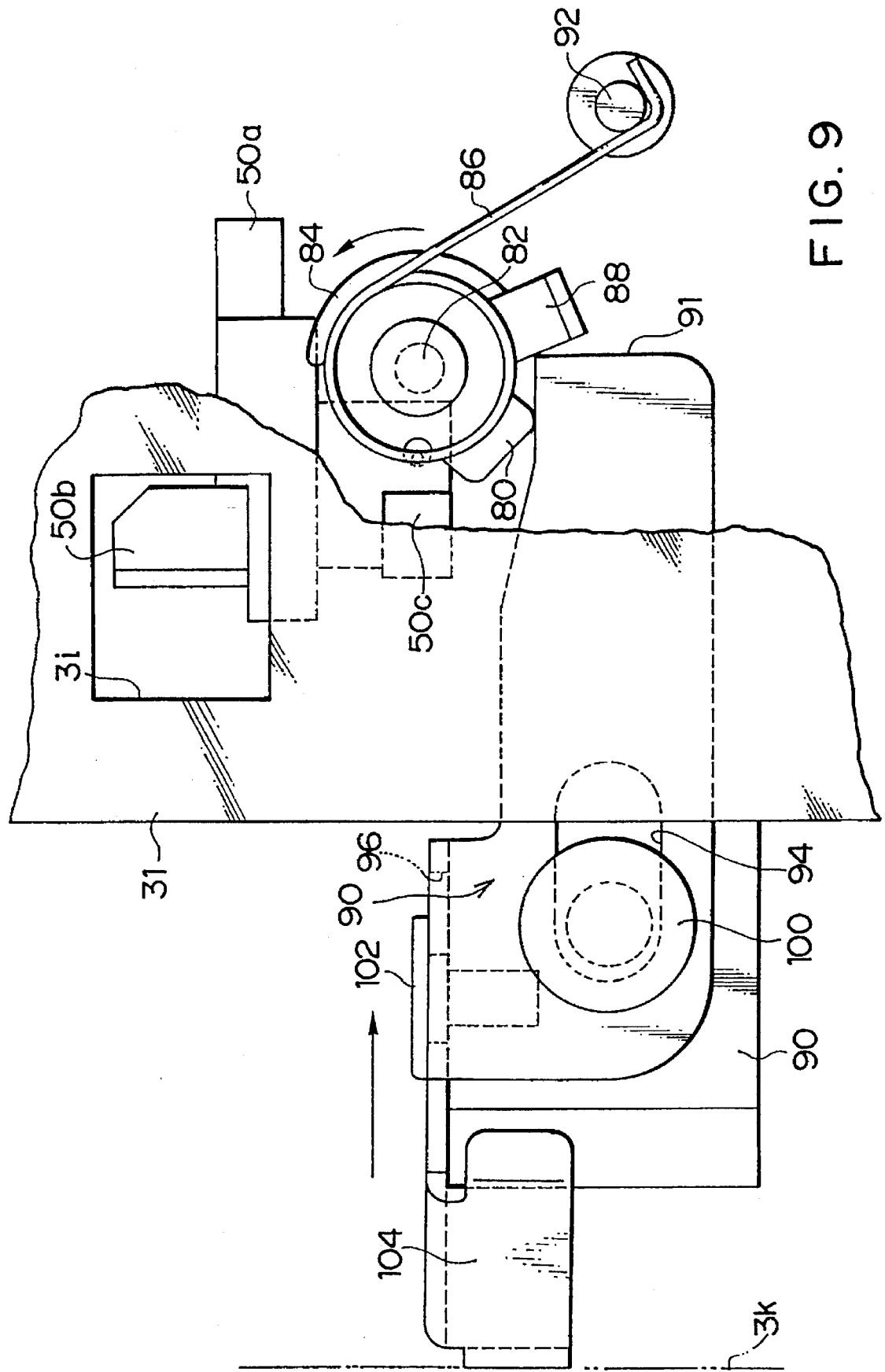
FIG. 9 is a top view of the regulating member and the regulating releasing member in such a state that the regulation is released.

Next, when the film pack 1 is set in the film pack holder 19, the edge portion 3k at the bottom of the pack main body 3 (as shown in FIG. 7 and FIG. 9) is abutted against the trigger plate 104, which is a regulating releasing member. When the pack main body 3 is set at its final position, the trigger plate 104 is pushed by the edge portion 3k as shown with a two-dot chain line in FIG. 7, and moves in the righthand direction in the drawing. Thus, the lever 90 slides in the right direction in FIG. 8, and then the right end portion 91 of the lever 90 pushes the projecting piece 88 so that the lock lever 84 can rotate counterclockwise against the pressure from the torsion spring 86. Then, as shown in FIG. 9, the stopper 80 retracts from the receiving portion 50c of the lever 50. In this embodiment, if the film pack 1 is set in the film pack holder 19, the rotation of the lever 50 by the stopper 80 is released. The latch mechanism and the counter mechanism return to their original positions as shown in FIG. 4.

When the lid is closed after the film pack 1 is set in the film pack holder 19, the projecting portion 27 is engaged with the groove portion 2c, and the cap 2 is held between the main body of the holder 16 and the lid 21 (see FIG. 3). Then, the projections 7e and 7f are pushed down by the projection 28, and the nail member 7 is moved downwardly. The nails 7a and 7b are removed from the engagement holes 5b and 5c of the slide 5, so the lock of the slide 5 is released.

Figure 6:
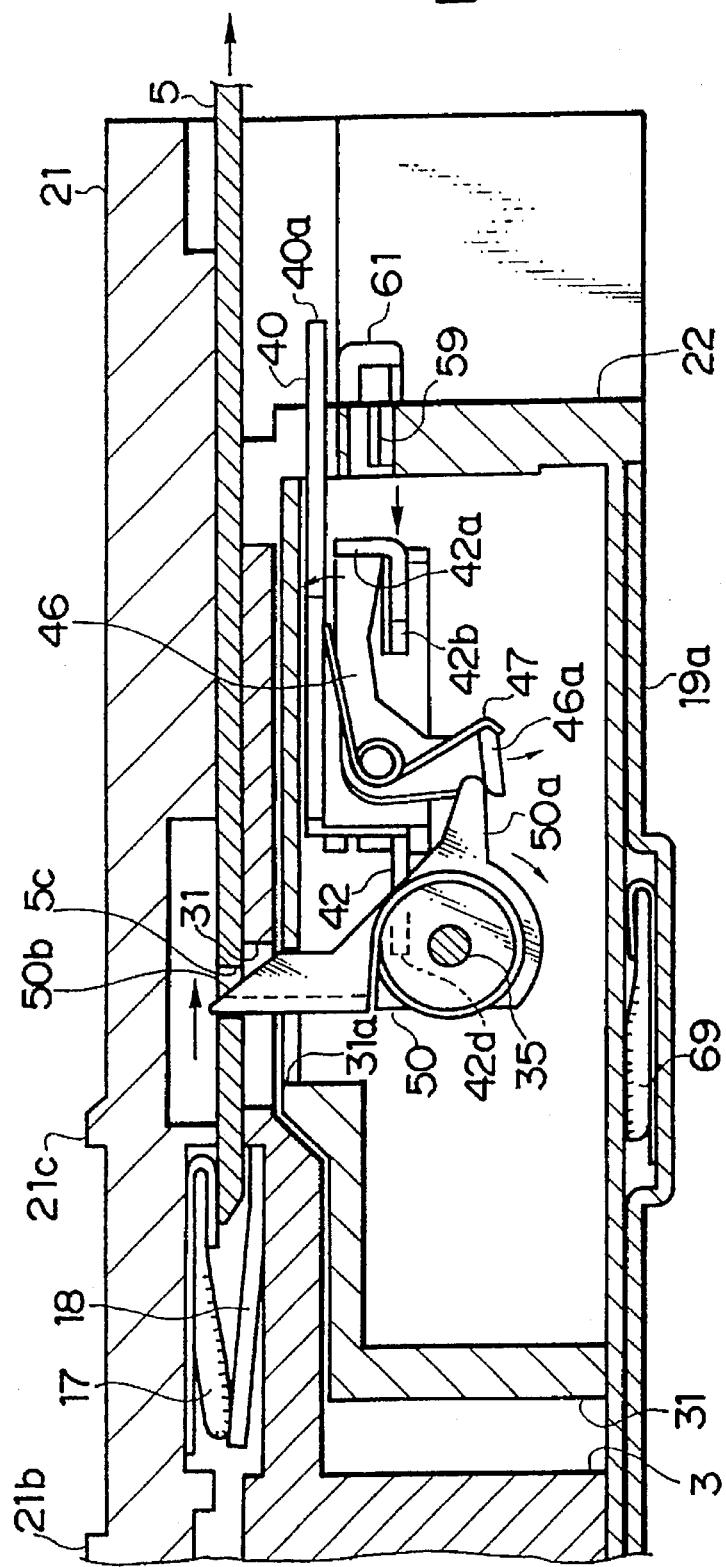
FIG. 6 is an enlarged cross-sectional view of the latch mechanism and the counter feed mechanism in such a state that a slide is pulled out.
Figure 10:
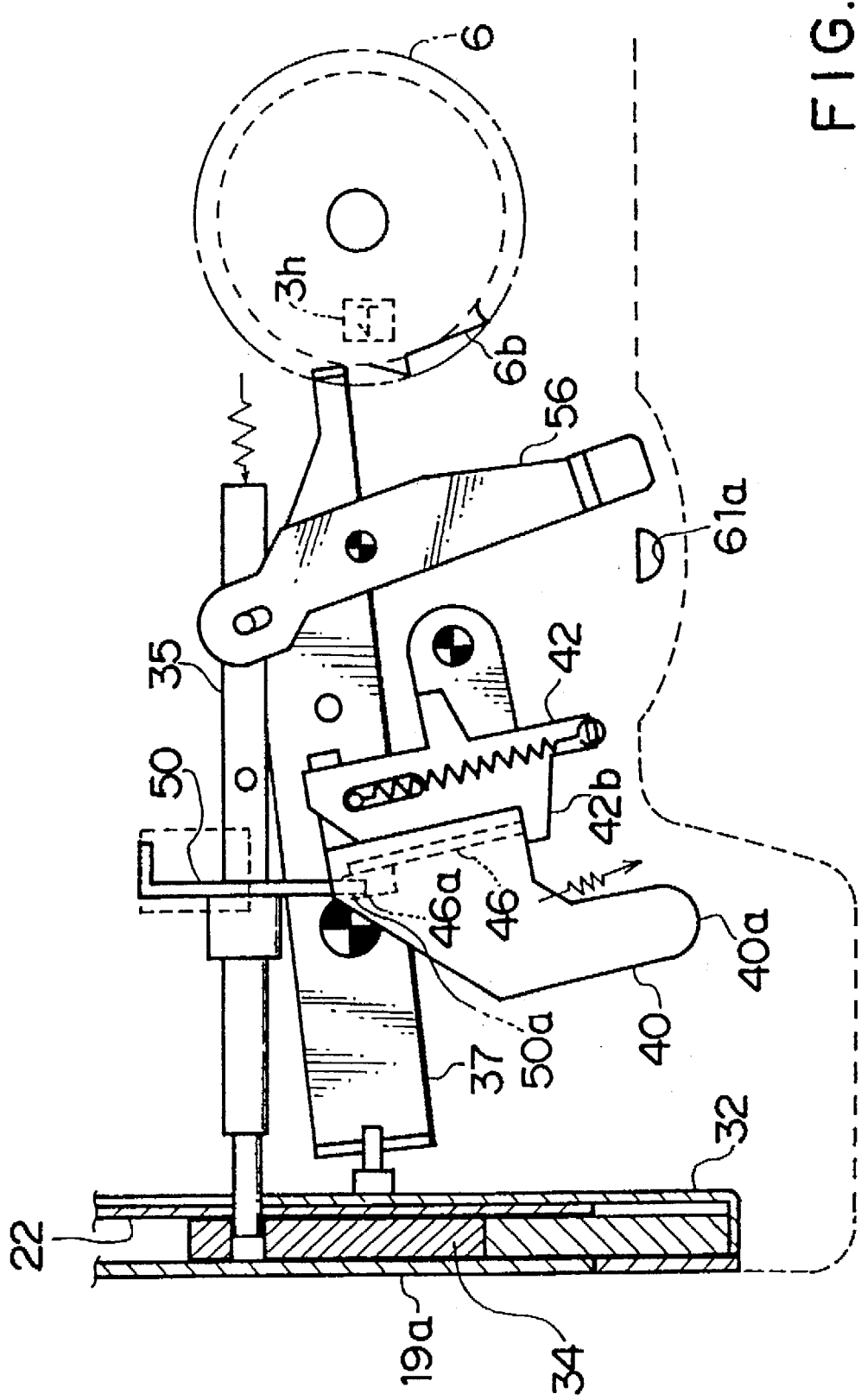
FIG. 10 is enlarged plane view of the latch mechanism and the counter feed mechanism in such a state that the slide is beginning to be pulled out.
Figure 11:
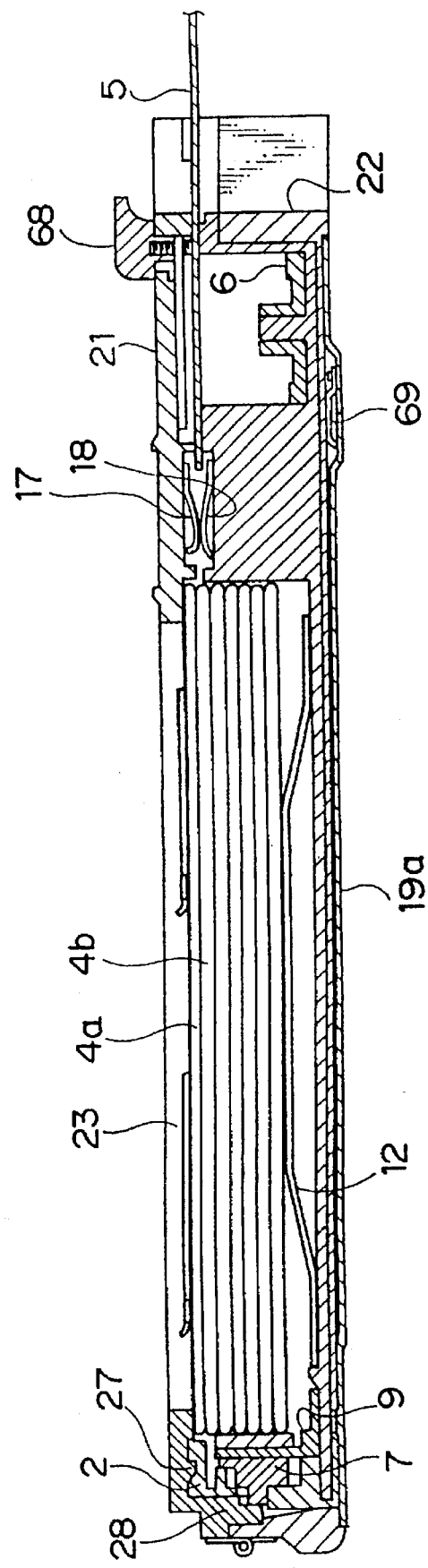
FIG. 11 is a cross-sectional view of the film pack holder and the film pack in such a state that the slide is pulled out.

When the slide 5 begins to be pulled out after the film pack holder 19 is set in the exposure frame 67 of a large-sized camera, the regulation by the projection (see FIG. 4) is released and the lever 40 is rotated. Then the receiving portion 46a is moved to a position to be engaged with the projection 50a. When the slide 5 is pulled out to a position as shown in FIG. 11, the opening 3a of the pack main body 3 is opened fully, and the first sheet film unit 4a is pushed up by the plate spring 12. Then, the sheet film unit passes through the opening 3a, and is pressed against a receiving surface of the film pack holder 19 to be positioned at a photographing position. In this case, as shown in FIG. 6, the nail portion 50b is engaged with the engagement hole 5c, and the hand which pulls the slide 5 feels a slight resistance. However, when the hand pulls out the slide 5 a little further, the slide 5 is no longer pulled out. Incidentally, as shown in FIG. 10, the slide frame 22 and the lever 32 are engaged with the main body of the holder 19a by the lever 35 and stop in this state. If the slide 5 is pulled out, the slide frame 22 and the lever 22 are not moved.

Figure 12:
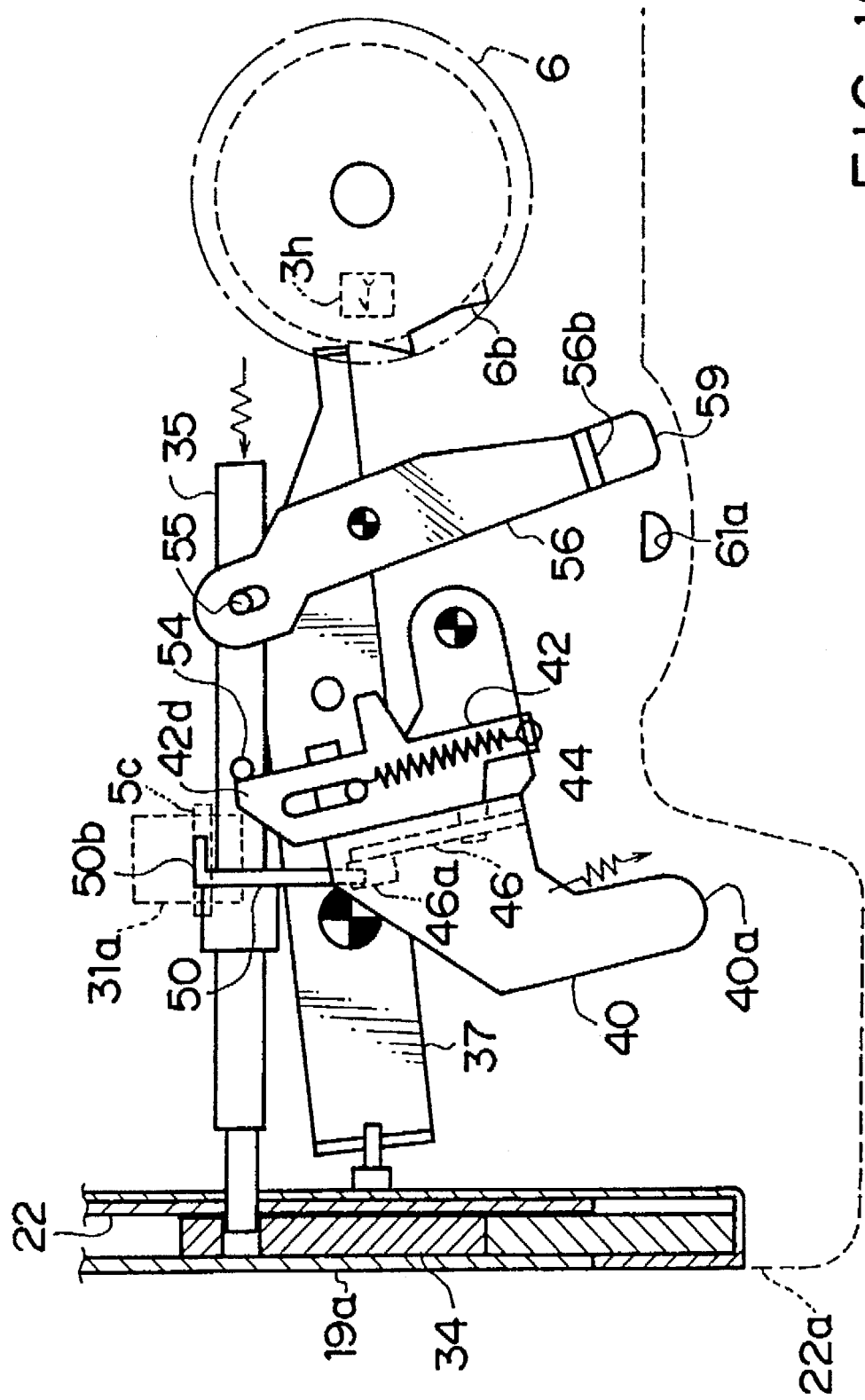
FIG. 12 is a cross-sectional view of the film pack holder and the film pack in such a state that the slide is opened.
Figure 13:
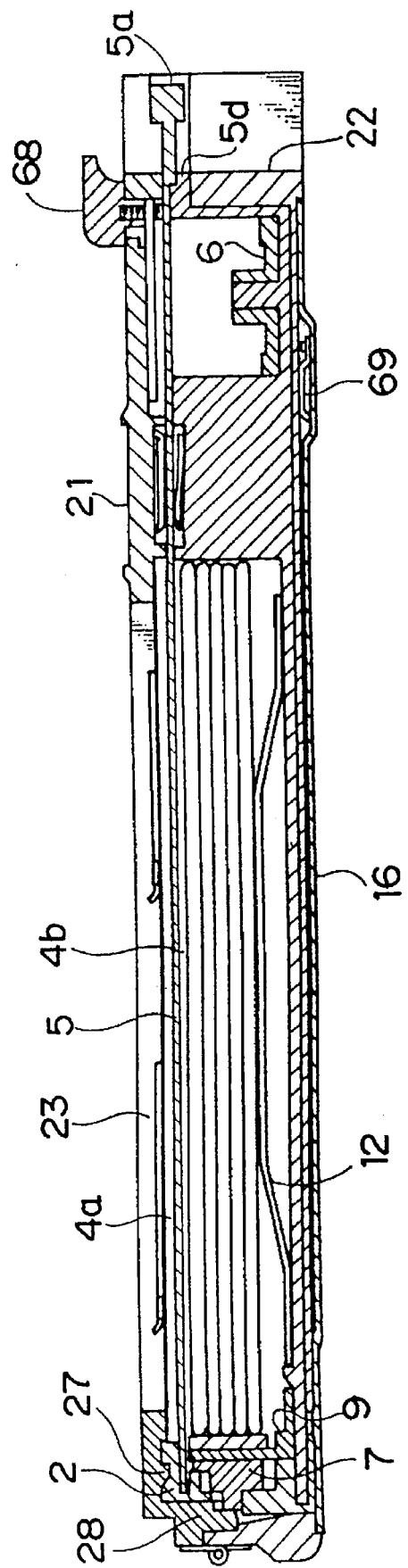
FIG. 13 is a cross-sectional view of the film pack holder and the film pack at the time of photographing.

If the slide 5 is further pulled out after the nail portion 50b is engaged with the engagement hole 5c as described above, the lever 50 is rotated clockwise in FIG. 6, and the projection 50a pushes down the receiving portion 46a to rotate an engagement lever 46 counterclockwise. Thus, the lock of the lever 42 is released, and is moved towards the lever 35 by the pressures from the spring 44 as shown in FIG. 12. A forward end nail 42d is engaged with the pin 54.

Figure 14:
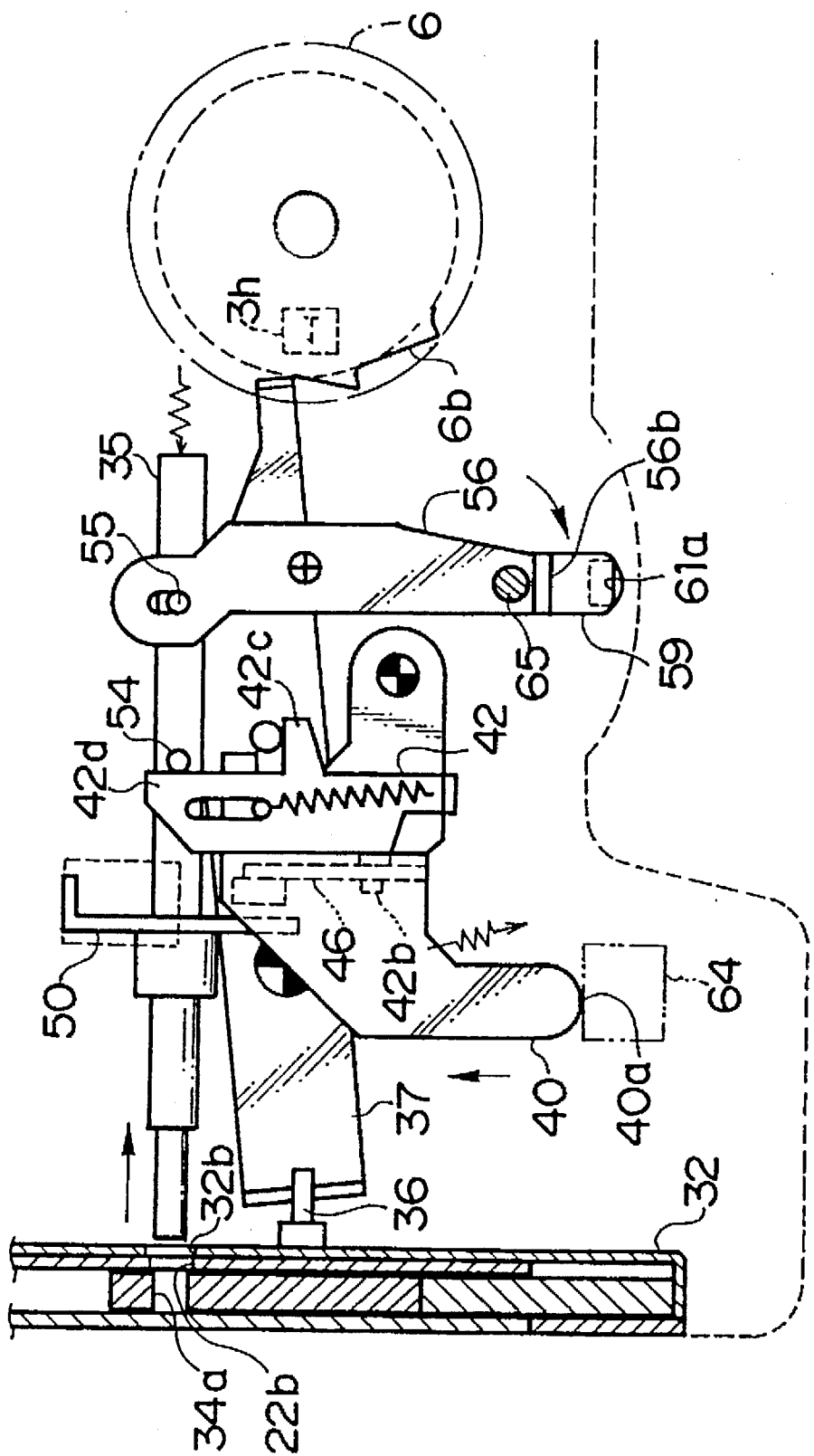
FIG. 14 is a cross-sectional view of the film pack holder and the film pack in such a state that the slide is closed.

Next, when returned to its original position, the slide 5 enters a space between the first sheet film unit 4a and the second sheet film unit 4b, so that the flatness of the sheet film unit 4a at a photographing position can be secured. In this case, as shown in FIG. 14, the projection 64 presses the end portion 40a, so the lever 40 is rotated clockwise. Then, the lever 42 is rotated together with the lever 40, so the pin 54 is pressed to the right side of the drawing by the forward end 42d. The lever 35 is moved to the right side, and is pulled out of the holes 2b, 32b and 34a. At the same time, the lever 56 is rotated clockwise by the pin 55, and a signal indicating that the preparation for photographing is completed is displayed in the window 61a by the piece 59. The bending portion 56b is arranged outside the projection 65. In this state, the shutter of the large-format camera is released, so that the first sheet film unit 4a can be exposed.

If the hand 5a is pulled after the first photographing operation is completed as mentioned above, the projection 65 is engaged with a flexible portion 56b, and the slide 5, the pack main body 3, the slide frame 22 and the lever 32 are pulled out of the film pack holder 19 at the same time. Only the cap 2 remains in the inner part of the film pack holder 19.

In this case, the first photographed sheet film unit 4a is engaged with the edge part of the receiving surface and stops in this state. Therefore, the first sheet film unit 4a passes through a space between the upper part of the partition 3d and the receiving surface 24 to leave the pack main body 3. The sheet film unit 4a, which has been removed from the pack main body, is pushed into the bottom of the main body of the holder 19a by the spring 26. Incidentally, since the slide 5 closes the opening 3a of the pack main body 3, the light reaches the sheet film unit 4 within the pack main body even if the film pack 1 is pulled out of the film pack holder 19.

Figure 15:
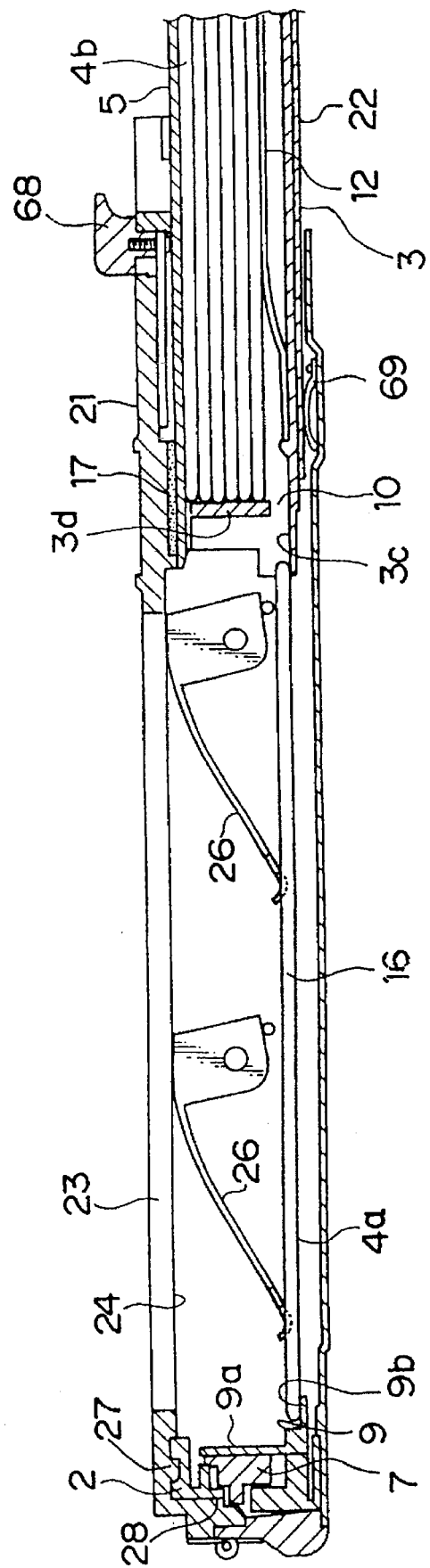
FIG. 15 is a cross-sectional view in such a state that the film pack is pulled out after photographing.
Figure 16:
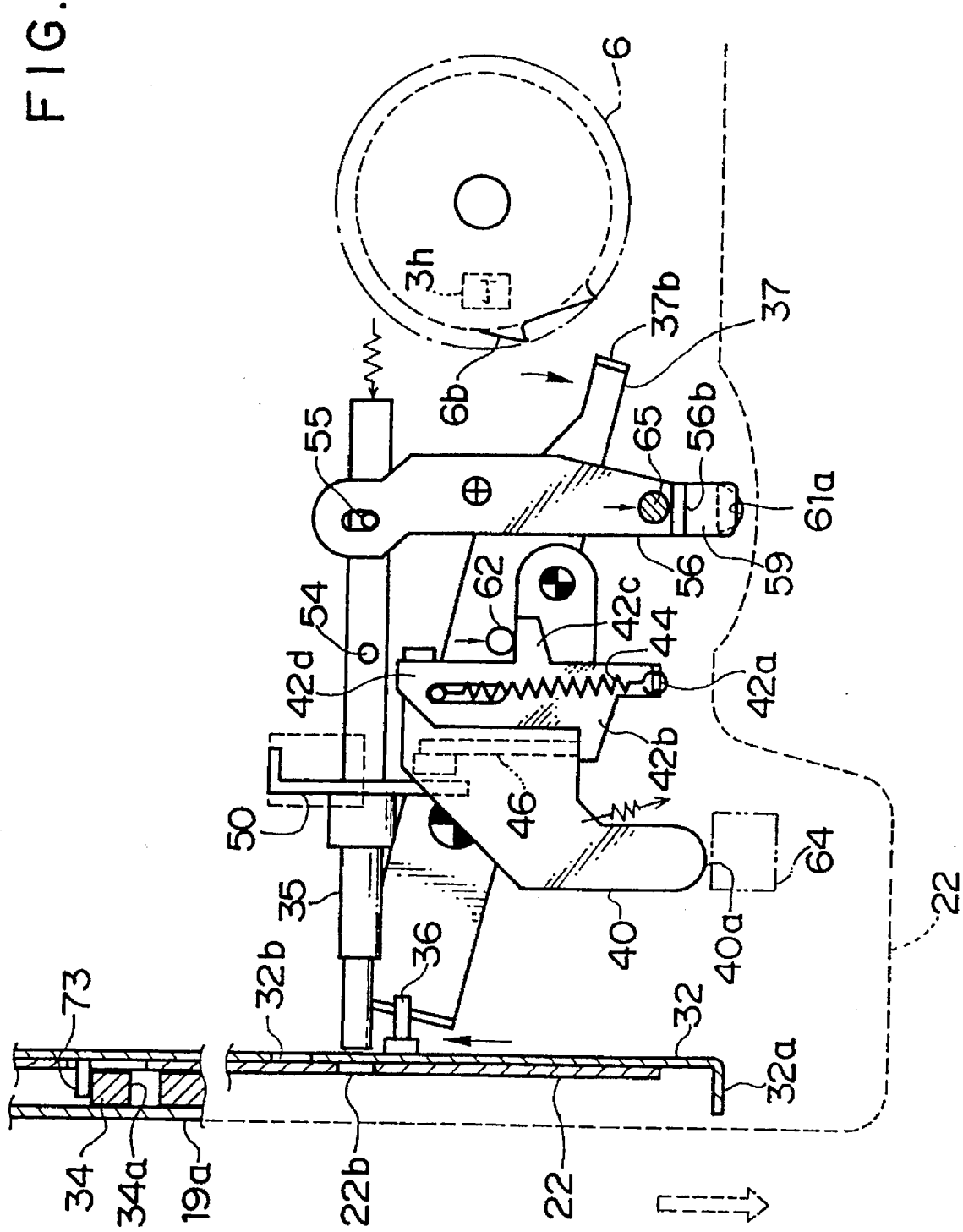
FIG. 16 is an enlarged plane view of the latch mechanism and the counter feed mechanism in such a state that a slide frame is pulled.
Figure 17:
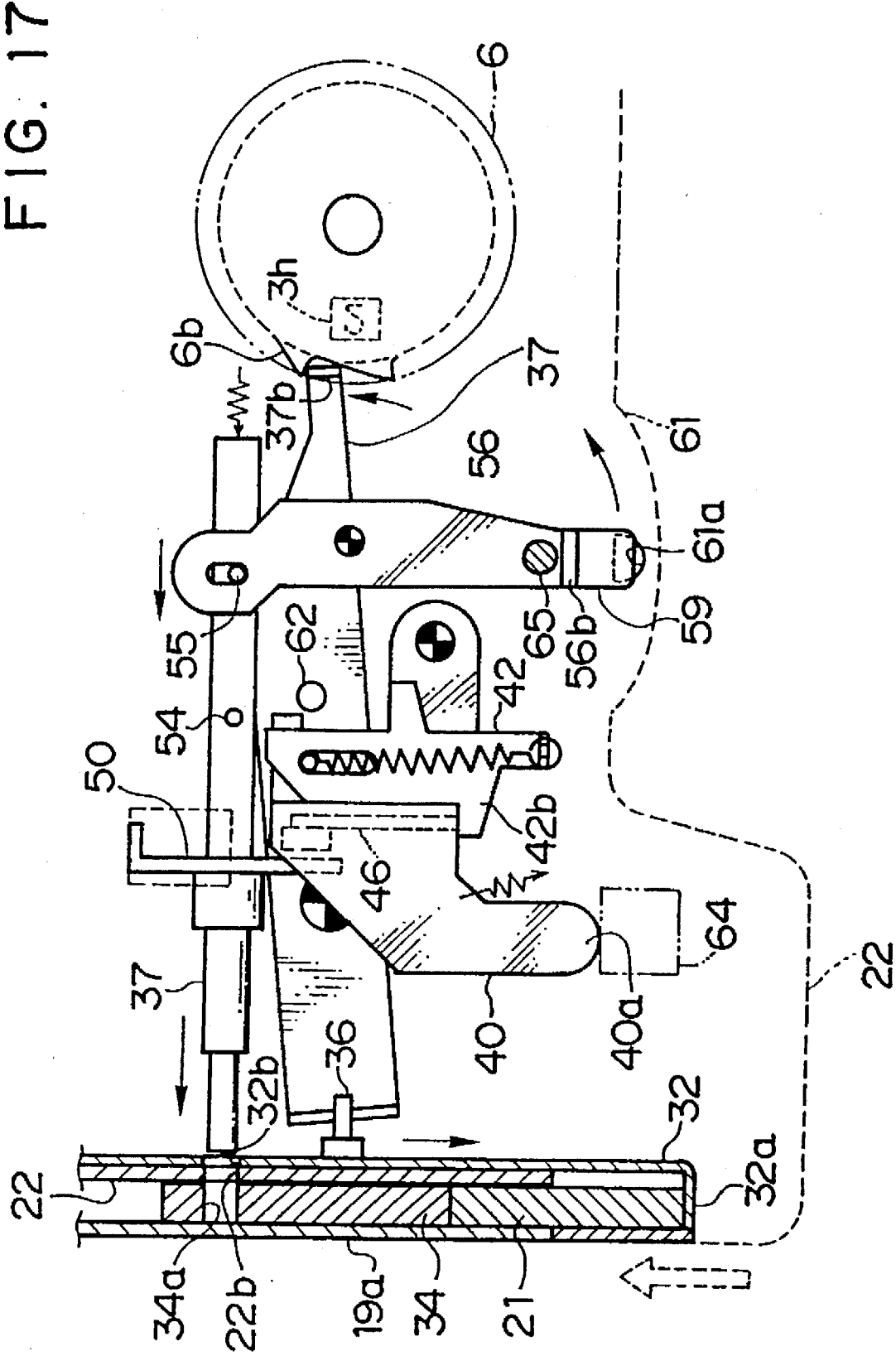
FIG. 17 is an enlarged plane view of the latch mechanism and the counter feed mechanism just after the slide frame is returned to its former state.

When the pack main body 3 is pulled out up to a position in FIG. 15, a pin 73 fixed at the lever 32 is abutted against an end of the plate 34 as shown in FIG. 16. Therefore, the lever 32 is displaced from the slide frame 22, and the pin 36 is moved towards the lever 35. As a result, the counter feed lever 37, which is engaged with the pin 36, is rotated in a clockwise direction in order to prepare for feeding the counter. In this case, even if the counter feed nail 37b slightly touches the tooth 6b of the counter display plate 6, the lower end 11a of the press spring 11 is abutted against the nail 6a, so the counter display plate 6 does not rotate in a counterclockwise direction. At the same time, the pin 62 is engaged with and presses the nail portion 42c, and returns the lever 42 to its original position against the pressure from the spring 44. The lever 42 is engaged with the engagement lever 46, and stays in this state.

Then, when the film pack 1 as well as the slide frame 22 is pushed into the main body of the holder 19a in a state that the hand 5a is caught by a hand, the sheet film unit 4a enters the pack main body 3 through the receive opening 10 which is an opening between the lower part of the partition 3d and the back surface inner wall 3e. Then, the sheet film unit 4a is stepped down on the plate spring 12, and is inserted into the lowest layer of the unexposed sheet film unit 4.

After the film pack 1 is completely inserted into the main body of the holder 19a as described above, the flexible portion 32a is abutted against the end surface of the leg portion 21a, and the lever 32 is returned to its original position. Therefore, the pin 36 also returns to its original position. Thus, the counter feed lever 37 is rotated in a counterclockwise direction, so the counter feed nail 37b is engaged with the teeth 6b, so that the counter plate 6 is rotated by only one tooth. As a result, the number of photographs for the next photographing, "2" is displayed in the counter display window 3h, and the cut piece 59 retracts from the window 61a. Further, the lock of the slide 5 by the portion 56b is released. Because the holes 22b, 32b, and 34b overlap each other in a straight line, the lever 35 is inserted into these holes, and the slide frame 22 is engaged with the main body of the holder 19a and stays in this state. The second sheet film unit 4b returns to its original position as shown in FIGS. 3 and 4. In this case, it is positioned just below the slide 5. After this, the same operations are repeated so that the photographing can be sequentially performed. Incidentally, the number of photographs, which is displayed in the counter display window 3h, can be observed through a window, which is formed in the main body of the holder 19a and the slide frame 22.

If the sheet film units 4 are sequentially photographed by repeating the above-mentioned procedure, the photographed sheet film unit 4 is piled from the top in the pack main body 3. The opening 3a is covered with the slide 5 (see FIG. 3). After all the photographing operations are completed for one film pack 1, an end mark "E" is displayed in a counter display window 7, and the press plate 11 is pushed up.

Therefore, the top end 11c is engaged with the engagement hole 5f so as to prevent the slide 5 from being pulled out. At the same time, a lock releasing mechanism (not shown) works to release the lock of the lid 21, so the lid 21 is rotated while a knob 68 is being operated to take out the used film pack 1.

Since th pressure of the projecting portion 28 on the projections 7e and 7f is released, the nail member 7 rises due to the pressure from the spring portions 7c and 7d. The nails 7a and 7b are engaged with the engagement holes 5b and 5c, so that the cap 2 can be connected to the slide 5. On the other hand, because the projection 5d of the slide 5 is engaged with the end portion of the pack main body 3, the cap 2 is engaged with the pack main body 3. Then, the pressure of the projecting portion 27 against the cap 2 is released, so the used film pack 1 can be taken out.

After the film pack is taken out, the lever 90 of the regulating releasing member in FIG. 9 returns to its original position, which is shown in FIGS. 7 and 8, because of the force from the torsion spring 86. As a result, the lock lever 84 also returns to its original position, that is, a position where the stopper 80 regulates the rotation of the lever 50. Therefore, even if the hand touches the nail portion 50b of the lever, the rotation of the lever 50 can be prevented.

Accordingly, the film pack holder according to this embodiment can prevent errors in the operation of the display mechanism.

Figure 18:
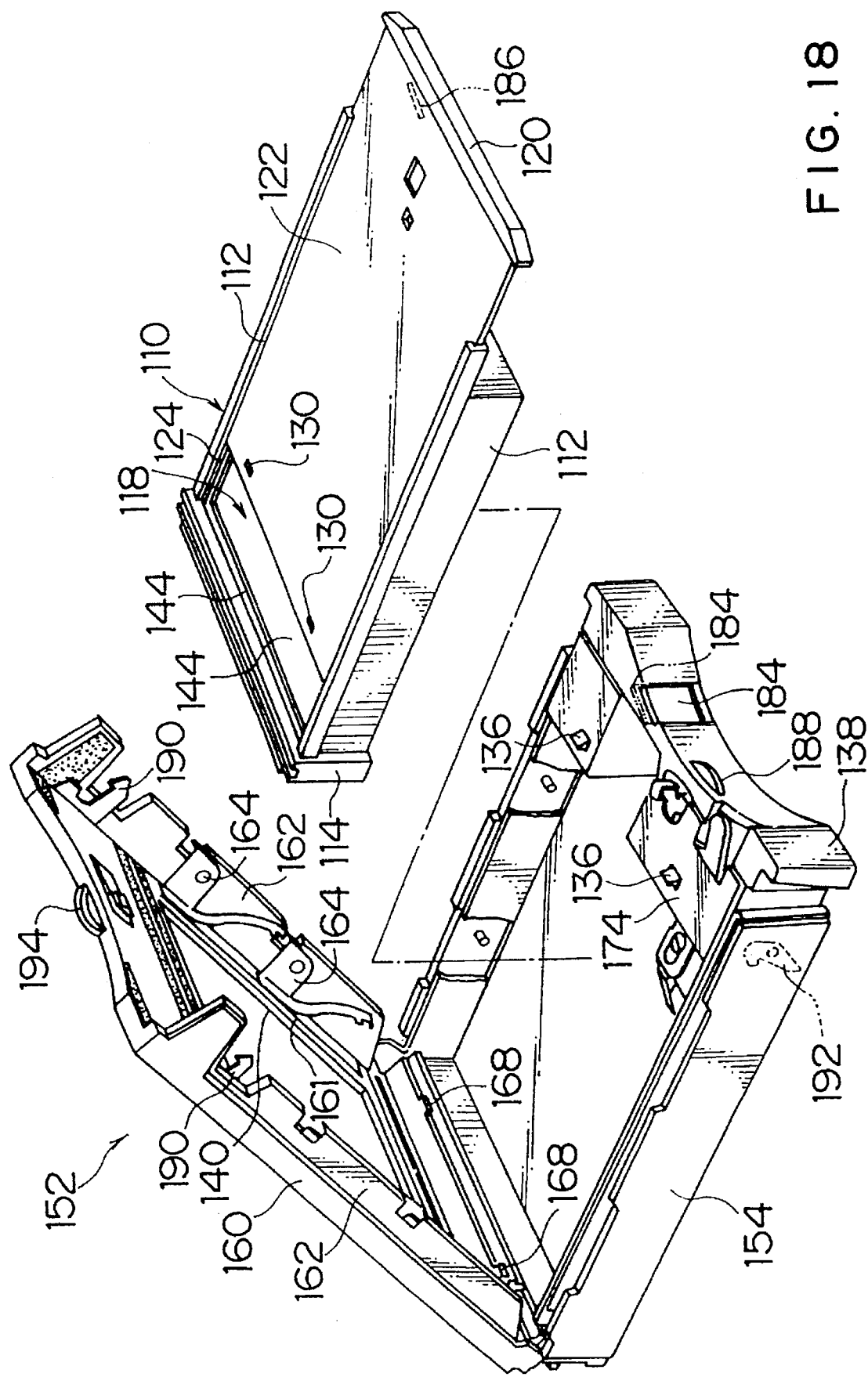
FIG. 18 is a perspective view of a film pack holder and a film pack according to the second embodiment of the present invention.

FIG. 18 is a perspective view illustrating the second embodiment of the film pack holder according to this invention.

First, an explanation will be given of a film pack which is set in the film pack holder of the present invention. As shown in FIG. 18, the film pack 110 is constructed in such a manner that a cap 114 is attached at the forward end of a box-shaped pack main body 112, and a plurality of sheet film units 118 are piled and stored in the pack main body 112. A slide 122 is attached at an opening 112A formed on the front surface of the pack main body 112. The slide 122 is provided with a hand 120, which opens and closes the opening 112A. The slide 112 is larger than the sheet film unit 118. The photographer holds the hand 120 to open and close the slide 122, so that the slide 122 is moved back and forth along a groove which is formed on an internal wall of the side wall of the pack main body 112. A stopper (not shown) of the slide 122 is provided in the pack main body 112. When the slide 122 is pulled out from the pack main body 112 by a predetermined length, the slide 122 is locked.

Figure 19:
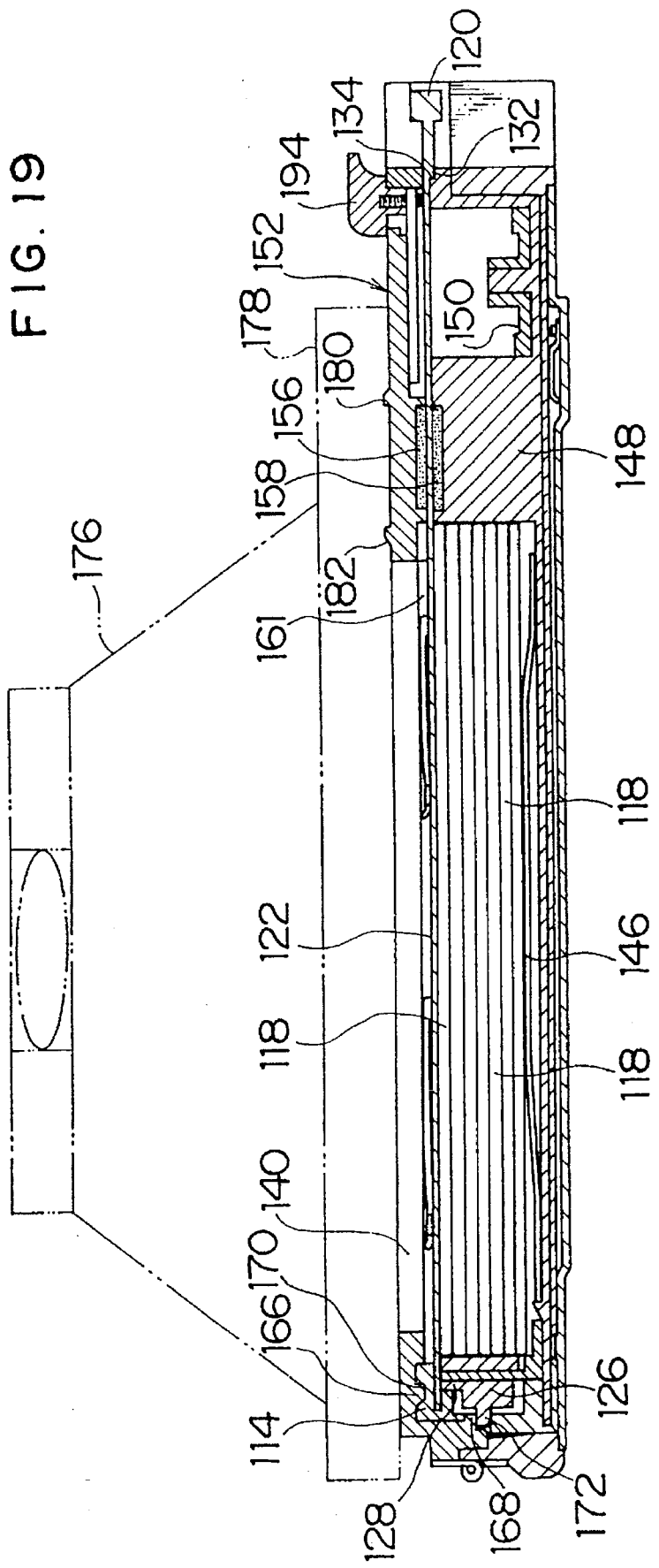
FIG. 19 is a longitudinal cross-sectional view illustrating a state that the film pack holder is set in a camera.

As shown in FIG. 19, a nail member 126, which is forced upwardly, is provided within the cap 114. A pair of nails 128, 128, which are formed at the nail member 126, are engaged with engagement holes 130 and 130, which are formed at the forward end portion of the slide 122 (see 118), so that the slide 122 can be engaged with the cap 114 and stay in this state. A projection 132 is formed on the back of the slide 122 and near the hand 120. The projection 132 is engaged with a step 134 of the pack main body 112 so as to prevent the slide 122 from moving towards the cap 114. As a result, the cap 114 is not removed from the pack main body 112 in such a state that the forward end portion of the slide 122 is connected to the cap 114. When the slide 122 is pulled out from the main body 112 by a predetermined length, the engagement holes 130, 130 are engaged with nails 136, 136 near a slide frame 138, which will be described later. Thus, the slide 22 is locked when pulled out by a predetermined length.

As shown in FIG. 18, the sheet film unit 118 is composed of a 4×5 inch-size sheet film 142 and a thin sheet sheath 144 such as a metal piece, which supports the base surface of the sheet film 142 and in which three dimensions are bent so as to enclose three dimensions of the sheet film 142. If the sheet film 142 is kept flat and there is a sufficient strength, the sheath 144 may be made of plastic.

As shown in FIG. 19, for example, 7 sheet film units 118 are piled to be stored in the pack main body 112. The sheet film units 118 are pressed towards the front surface (the upper part in FIG. 19) by a plate spring 146, of which one end is fixed on a back surface inner wall of the pack main body 112. Thus, the sheet film unit 118 is secured to the back of the slide 122. The inside of the pack main body 112 is divided into two by a partition 138. The sheet film unit 118 is stored in the left chamber, and a disc 150 for counter display is provided in the right chamber. Numbers "1", "2". . . "7" indicating the number of photographs and an end mark "E" are carved on the bottom of the disc 150. One of the numbers can be observed through a window (not shown) which is formed at a main body of a holder 154 of the film pack holder 152. The disc 150 is driven by a mechanism of the film pack holder 152 every time one sheet film unit 118 is photographed. Numbers 156 and 158 indicate a light shielding cloth which prevents the light from entering a space between the slide surface 122 and a slide surface, on which the slide 122 is moved back and forth.

As shown in FIG. 18, the film pack holder 152 according to the embodiment of the present invention is composed of the main body of the holder 154, a lid 160 which is arranged on a top surface of the main body of the holder 154 in such a manner to open and close, and the slide frame 138 which is attached in the main body of the holder 154 in such a manner to move back and forth. A photographing opening 140, which is smaller than the sheet film unit 118, is formed on a surface of the lid 160. A receiving surface 161 is formed on an outer periphery of the opening 140 so as to hold the sheet film unit 118 in a photographing position.

Plate springs 164, 164... are provided within both of side walls 162 and 162 which are arranged in a longitudinal direction of the lid 160. When the film pack 110 is set in the film pack holder 1523 and the lid 160 is closed, the plate spring 164 presses the pack main body 112 downwardly. The plate spring 164 presses the sheet film unit 118, which is discharged from the pack main body 112.

As shown in FIG. 19, a wide projection 166 is formed close to a hinge of the lid 160. A pair of projecting portions 168 are formed at the projection 166. When the lid 160 is closed, the projection 166 is engaged with a groove 170 in the cap 114 so as to hold the cap 114 within the film pack holder 152. The projection 168 pushes down projections 172 and 172 of the nail member 126 so as to retract the nail 128 from the engagement holes 130 and 130 of the slide 122, so that the engagement of the slide 122 with the cap 114 can be released.

A mechanism, which controls the movement of the slide frame 138 and drives the disc 150, which is built in a box 174 provided near a back end of the slide frame 138 in FIG. 18. As shown in FIG. 19, the film pack holder 152 is attached at an exposure frame 178 of a large-sized camera 176, which is shown with a two-dot chain line in the drawing, by positioning convex portions 180 and 182 in such a manner that the film pack holder 152 is shielded from the light.

As shown in FIG. 18, a slide lock piece 184 is provided on a back end surface of the slide frame 138 in such a manner to move up and down freely. The slide lock piece 184 is held at the top and bottom positions by a click mechanism (not shown). When the slide lock piece 184 is held at the top position, it is engaged with a groove 186, which is formed on the back of the slide 122. Thus, it can prevent the slide 122 from being pulled out carelessly. Further, if the film pack 110 is carried in a state of being set in the film pack holder 152, the slide 122 does not open. Number 188 indicates an arc projection, which can be seen from the photographer when the film pack holder 152 is set in the large-format camera. For example, a red mark is displayed when the preparation for photographing is completed.

Figure 24:
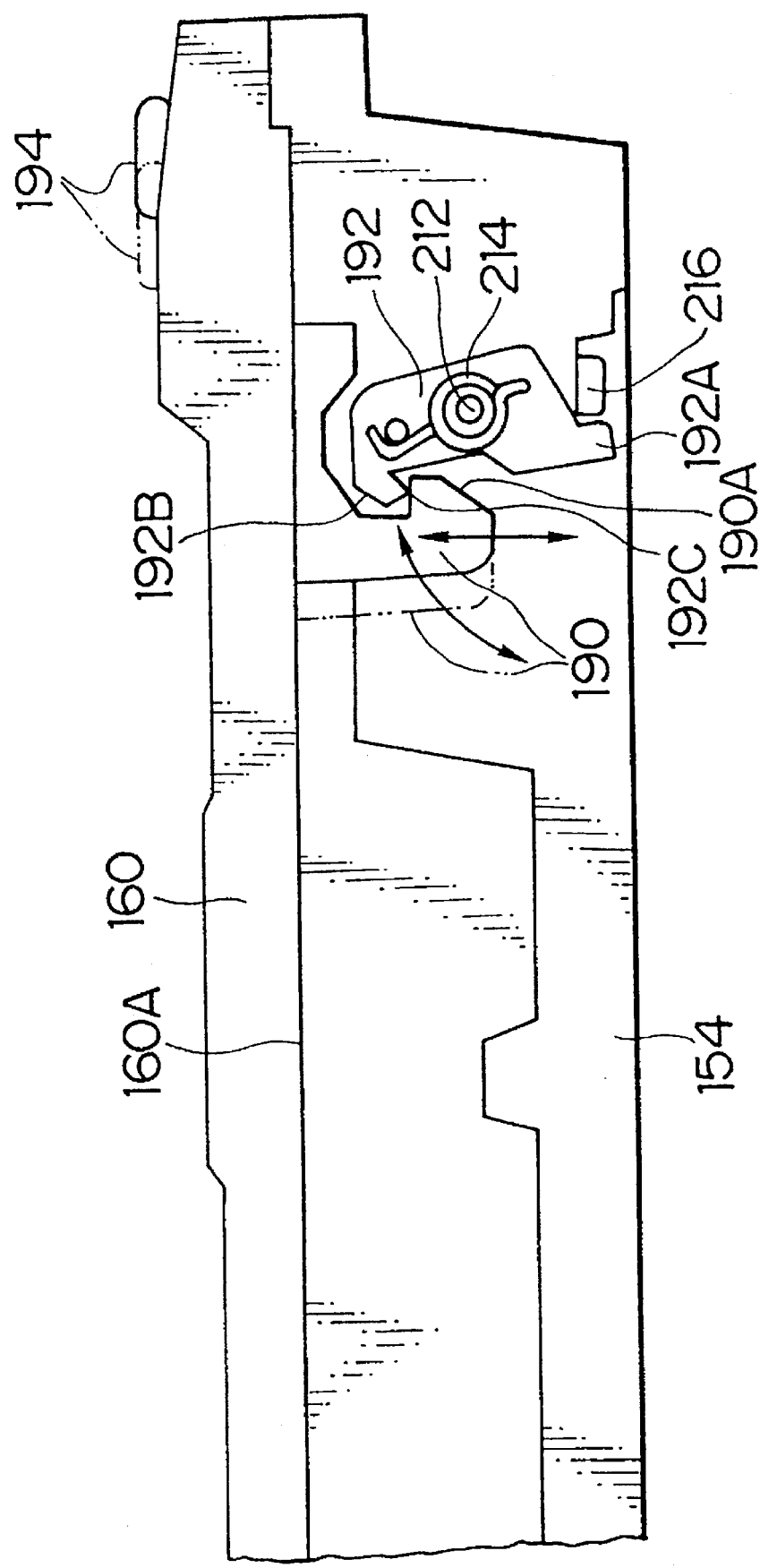
FIG. 24 is a side view illustrating a state that the lid is engaged with the main body of the holder.

As shown in FIG. 18, a pair of nails 190 and 190 are provided near the back end portion of the lid 160 in such a manner to project downwardly. The nails 190 and 190 are engaged with nails 192 and 192, which are provided at the main body of the holder 154 and are shown in FIG. 24, so as to lock the lid 160 at the main body of the holder 154.

Figure 20:
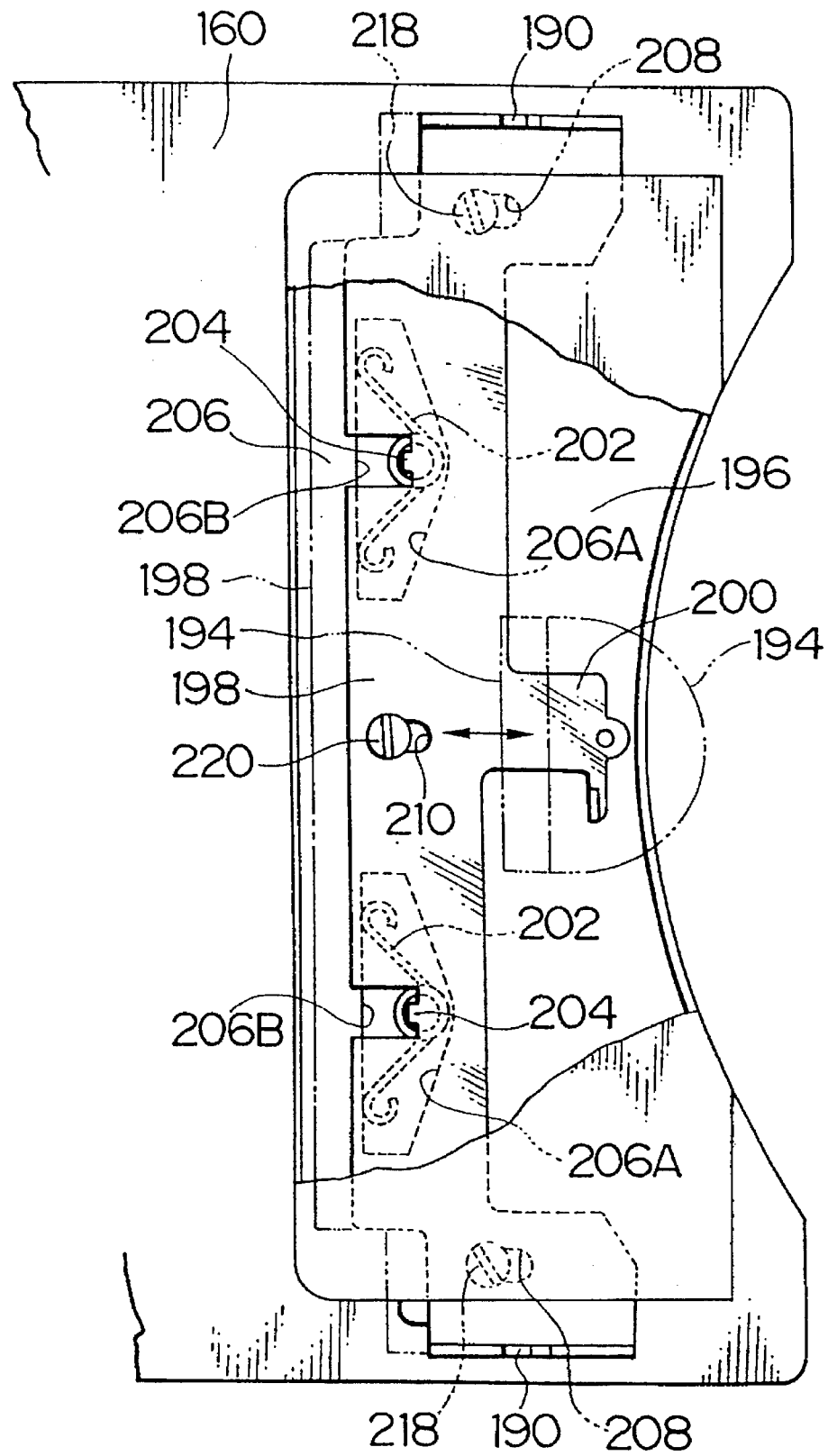
FIG. 20 is a partially cutaway plane view illustrating a forcing member of a nail of the lid.

As shown in FIG. 20, a rectangular plate 198, which is a nail main body, is arranged in a space 196, which is formed at the back end portion of the lid 160. Both end portions of the plate 198 are bent downwardly by 90° so that the nails 190 and 190 can be formed. A projecting piece 200, which is formed at the center of the plate 198, is connected to a knob 194 in FIGS. 18 and 20. Two torsion coil springs 202 and 202 are symmetric with respect to each other which lay a across the center of the plate 198. The plate 198 is pressed in a righthand direction in the drawing by the torsion coil springs 202 and 202.

Figure 21:
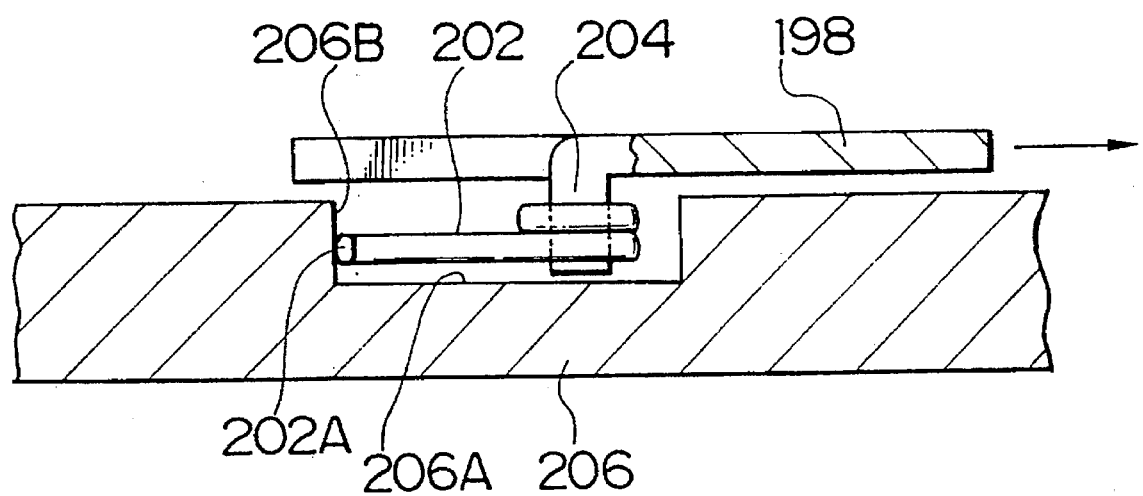
FIG. 21 is an enlarged cross-sectional view illustrating a state that a nail main body and a coil spring are attached.

As shown in FIGS. 20 and 21, the torsion coil spring 202 is supported by a piece 204, which is cut out from the plate 198 and is bent downwardly in FIG. 21. As shown in FIG. 21, the torsion coil spring 202 is arranged in a concave portion 206A, which is formed inside a bottom plate 206 of the lid 160. A spring piece 202A of the torsion coil spring 202 is pressed and abutted against a side surface 206B of the concave portion 206A so as to press the plate 198 in a righthand direction in the drawing.

As shown in FIG. 20, long holes 208 and 210 are formed at the both ends and the center of the plate 198 in a direction in which the torsion coil springs 202 and 202 press the plate 198. Guide pins 218 and 124, which are provided in the lid 160, are engaged with the slots 208 and 210. Thus, the plate 198 can move back and forth along the slots 208 and 210 in righthand and left hand directions in FIG. 20. When the knob 194 is pressed in the left hand direction in FIG. 20 against the pressure from the torsion coil springs 202 and 202. The nail 190 is moved to a position, which is shown with a two-dot chain line (a position for releasing the engagement), by the long holes 208 and 210 and the guide pins 218 and 220. Further, when the hand is removed from the knob 194, the nail 190 returns to its original position by the torsion coil springs 202 and 202, and moves to a position, which is shown with a solid line in FIG. 24 (an engagement position). Therefore, the nail 90 is arranged in a direction of a nail 192 in such a manner to move back and forth freely.

Figure 22:
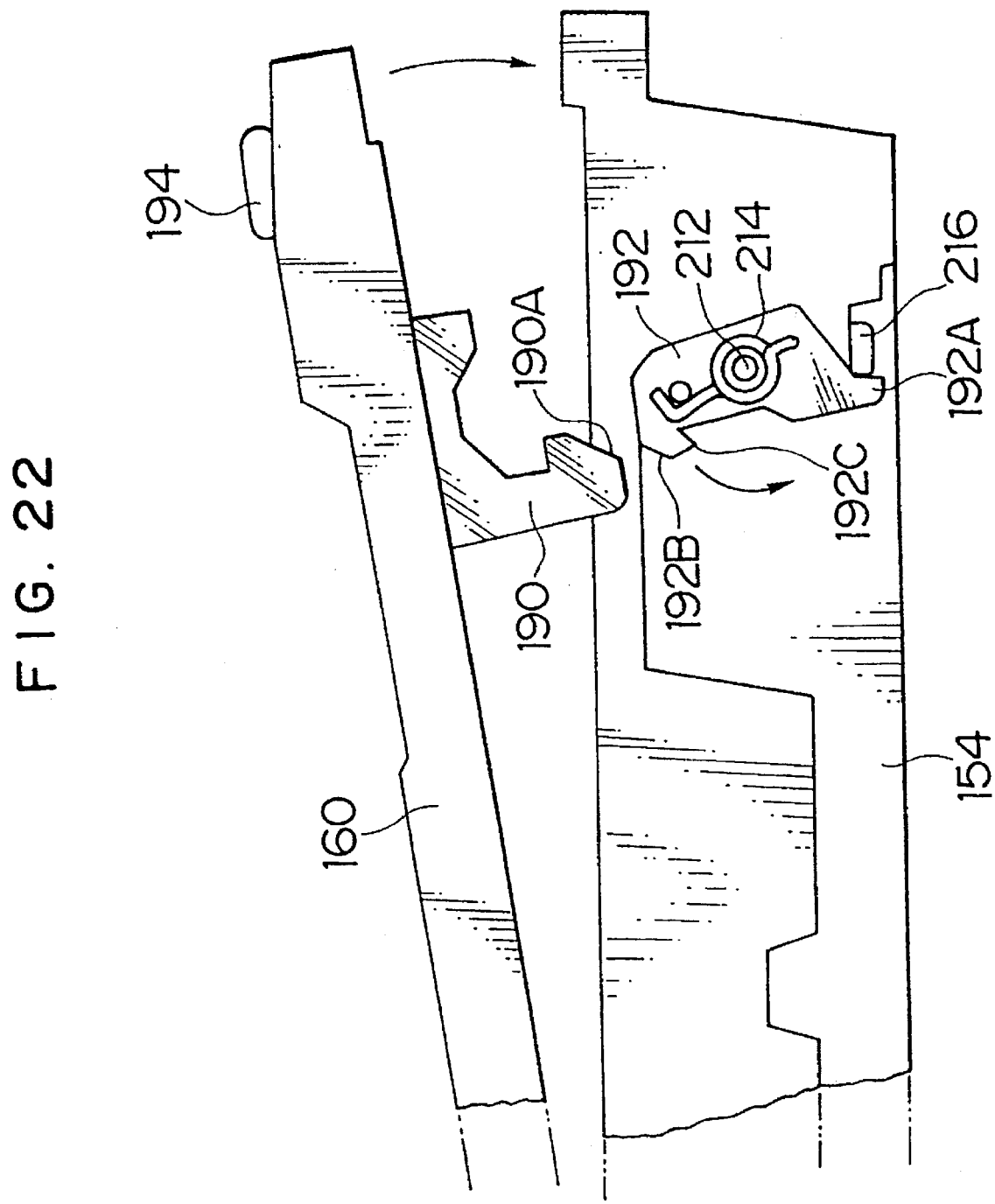
FIG. 22 is a side view illustrating a state that the lid is being closed.

The nail 192 is supported by an axis 212 as shown in FIG. 22. The nail 192 is pressed in a counterclockwise direction in the drawing by a coil spring 214, which is attached to the axis 212. A bottom end 192A of the nail 192 is abutted against a stopper 216, which is formed in the main body of the holder 154 so that the rotational range can be regulated. The force from the coil spring 214 in the nail 192 is set to be stronger than the force from the torsion coil springs 202 and 202 in the nail 190.

Next, an explanation will hereunder be given of an operation of the film pack holder which is constructed in the above-mentioned manner.

Figure 23:
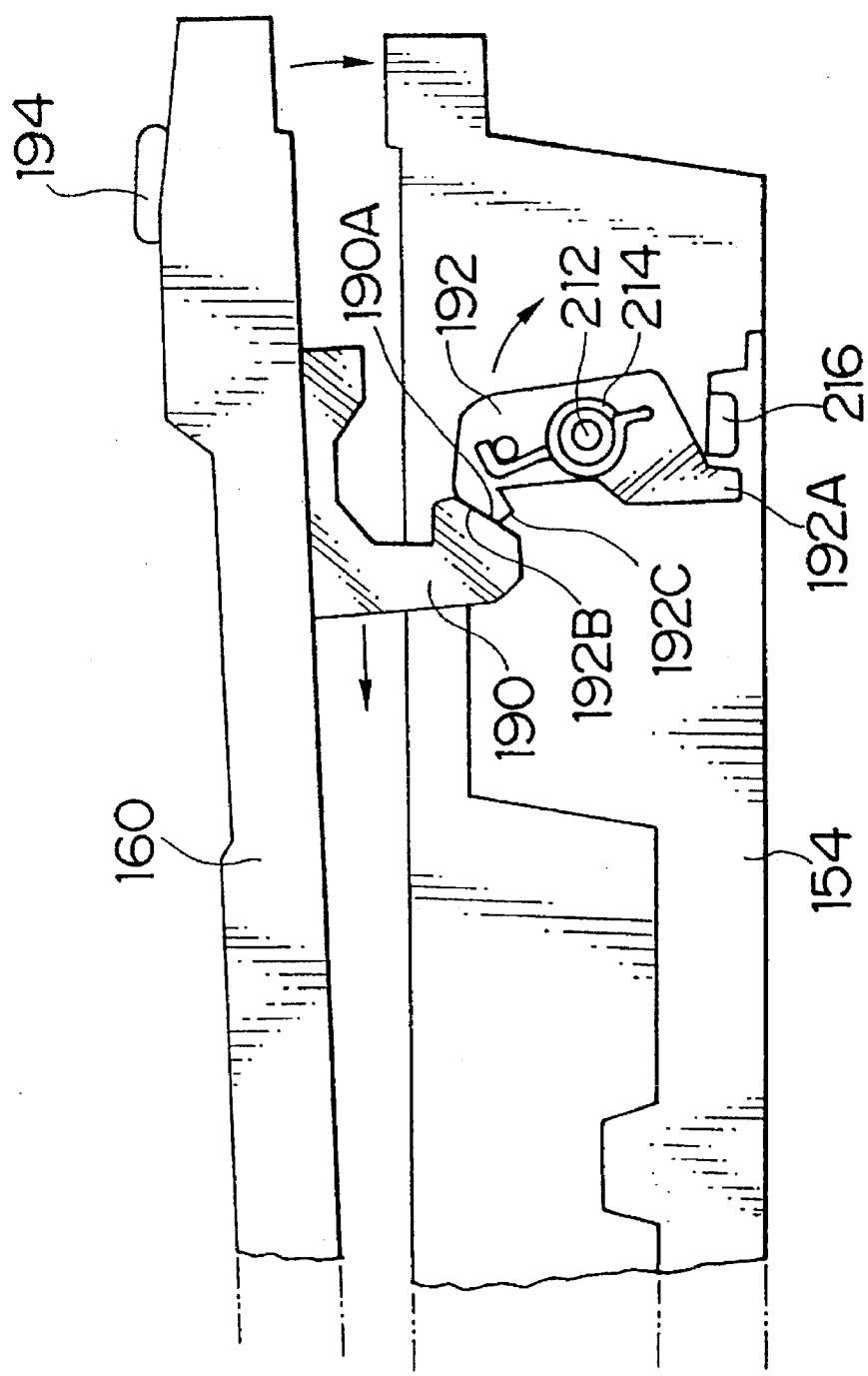
FIG. 23 is a side view illustrating a state that the nail of the lid abuts against the nail of a main body of a holder.

First, the lid 160 of the film pack holder 152 is opened, and the film pack 110 is set in the main body of the holder 154. Next, as shown in FIG. 22, the lid 160 is closed, so that a tapered portion 190A of the nail 190 in the lid 160 can be abutted against a top end tapered portion 192B of the nail 192 as shown in FIG. 23. When the lid 160 is pressed in the above-mentioned state, the nail 190 moves in a lefthand direction in FIG. 23 against the pressure from the torsion coil spring 202 (see FIG. 20). The pressure is transmitted from the nail 190 to the nail 192, so the nail 192 tries to rotate in a clockwise direction in FIG. 23. However, since the force from the coil spring 214 in the nail 192 is stronger than that of the torsion coil spring 202 in the nail 190, the nail 192 remains at a position in FIG. 22 until the force from the torsion coil spring 202 increases and reaches a predetermined value. When the nail 190 moves in the lefthand direction in the drawing by a predetermined length, and the force from the torsion coil spring 202 reaches the above-mentioned predetermined value, the nail 192 rotates in a clockwise direction as shown in FIG. 23. Thus, the nail 190 and the nail 192 overlap each other. Then, when the lid 160 is completely closed, the nail 190 moves in a righthand direction in FIG. 24 by the force from the torsion coil spring 202. At the same time, the nail 192 rotates in a counterclockwise direction in the drawing by the force from the coil spring 214. An edge portion 192C of the nail 192 is engaged with the nail 190, and the lid 160 is locked at the main body of the holder 154.

As shown in FIG. 19, when the lid 160 is closed, the projecting portion 166 is engaged with the groove portion 170 in the cap 114, and the cap 114 is held between the main body of the holder 154 and the lid 160. At the same time, the projection 172 is pushed down by the projecting portion 168, so that the nail member 126 can be moved downwardly. The nail 128 of the nail member 126 removed from the engagement hole 130 of the slide 122. As a result, the lock of the slide 122 is released.

Figure 25:
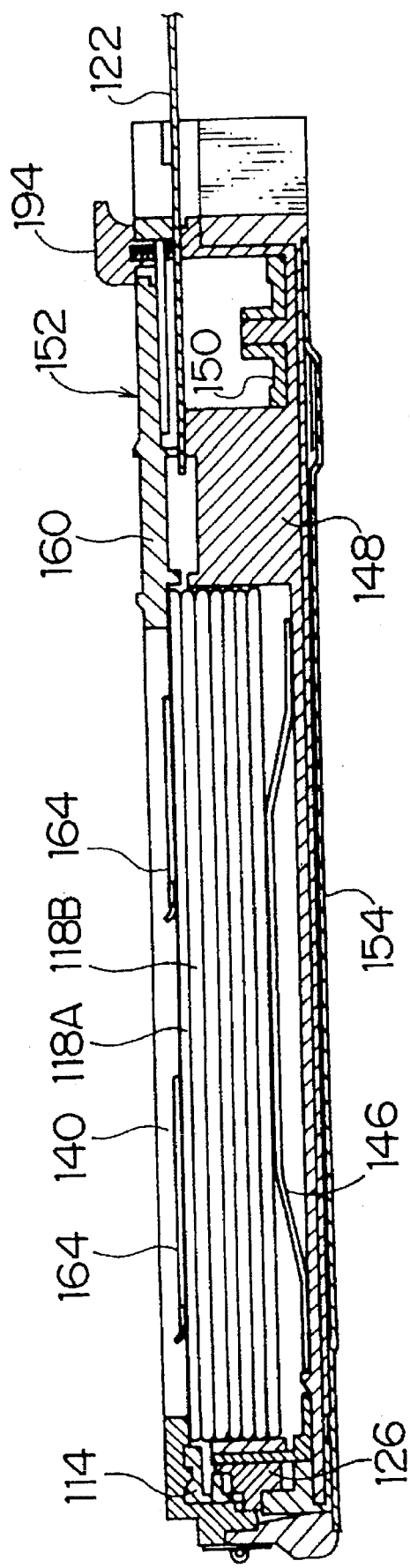
FIG. 25 is a longitudinal sectional view of the film pack holder and the film pack in such a state that the slide is pulled out.
Figure 26:
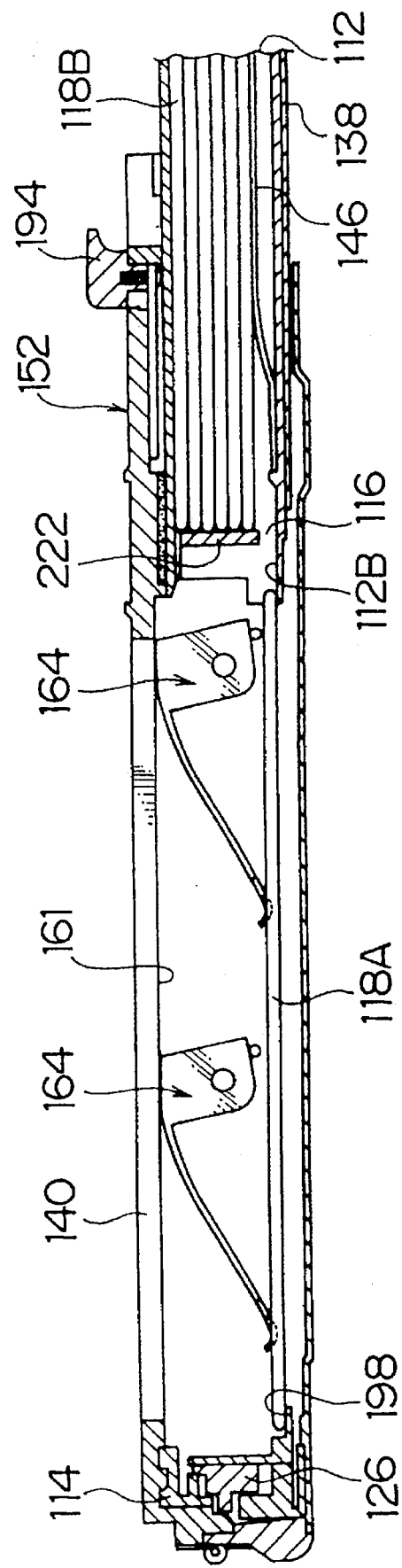
FIG. 26 is a longitudinal cross-sectional view of the film pack holder and the film pack in such a state that the film pack is pulled out together with a slide frame.

Next, the film pack holder 152 is set in the exposure frame 178 of the large-format camera 176. Then, the slide 122 is pulled out to a position in FIG. 25, and the engagement holes 130 and 130 are engaged with the nails 136 and 136 in the slide frame 138. Thus, the opening of the slide 122 can be regulated, and the opening 112A of the pack main body 112 is completely opened. Then, the first sheet film unit 118A is pushed up by the plate spring 136. The sheet film unit 118 passes through the opening 112A and is pressed against the receiving surface 161 of the film pack holder 152 so as to be held at a photographing position.

When the slide 122 is returned to its original position, the slide 122 enters a space between the first sheet film unit 118 and the second sheet film unit 118B, so that the sheet film unit 118A at the photographing position can be kept flat. In this case, the slide 122 is engaged with the pack main body 112, and stops in this state by a latch mechanism, which is built in the box portion 174. At the same time, the engagement of the main body of the holder 154 and the slide frame 138 is released. Furthermore, the mark is displayed at the arc projection, which can be seen by the photographer, so as to indicate that the preparation for photographing is completed. When the shutter of the large-sized camera 176 is released in this state, the first sheet film unit 118A is exposed.

When the photographer pulls the slide 122 by holding the hand 120 after the first photographing operation is completed as described above, the slide frame 138 and the film pack 110 are pulled out of the film pack holder 152 at the same time while the cap 114 is not moved. In this case, the first photographed sheet film unit 118A is stopped by the edge portion of the receiving surface 161, so the sheet film unit 118A leaves the pack main body 112 through a space between a top portion of a partition 222 and the receiving surface 161. The sheet film unit 118A, which has left the pack main body 112 completely, is pushed into the bottom of the main body of the holder 154 by the pressure from the plate spring 164. The left end of the sheet film unit 118A is held by the flexible plate 110, and the right end is held by the back surface inner wall 112B of the pack main body 112.

As the film pack 110 is inserted into the pack main body 154 together with the slide frame 138, the sheet film unit 118A passes through the receive opening 116 between the bottom end of the partition 13 and the back surface internal wall 112B, and enters the pack main body 112. Then, the sheet film unit 118A steps onto the plate spring 146, and is inserted into the bottom of the unexposed sheet film units 118B. After the film pack 110 is inserted into the main body of the holder 154 completely, the second sheet film unit 118B is positioned just below the slide 122.

Next, the rest of the sheet film units 118 is photographed in the above-described procedure. When the film pack 110 is taken out after the photographing, the knob 194 is pressed in order to release the engagement of the nail 190 and the nail 192. In this case, the plate 198, which is moved by pressing the knob 194, is supported by the two torsion coil springs 202 and 202, which are symmetric with respect to each other across the center as shown in FIG. 20. Therefore, the plate 198 moves smoothly without shaking in a direction of releasing the engagement against the force from the torsion coil springs 202 and 202 in order to release the engagement of the nail 190 and the nail 192.

Thus, according to the film pack holder in this embodiment, the lock of the main body of the holder 154 and the lid 160 can be released without fail when compared with the conventional film pack holder, in which a plate is unsteadily supported by one torsion coil spring.

Moreover, in this embodiment, because the torsion coil spring 202 is arranged within the concave portion 206A in the bottom plate 206 of the lid 160 as shown in FIG. 21, the breadth of the space 196 in FIG. 20 can be narrowed. Therefore, the lid 160 becomes thinner, and the film pack holder 152 can be compact.

In this embodiment, one nail member 190 is provided in the lid 160, and the other nail member 192 is provided in the main body of the holder 154. However, the present invention is not limited to this. One nail member 190 may be provided in the main body of the holder 154 in such a manner to move back and forth freely, and the other nail member 192 may be arranged in the lid 160 in such a manner to rotate freely.

As has been described above, according to the film pack holder of the present invention, the movement of the nail portion in the display mechanism is regulated by the regulating member before the film pack is set. As a result, the nail portion does not move even if the hand touches the nail portion. When the film pack is set in the slide frame, the regulating releasing member is pushed by the film pack so that the regulating member can be retracted from the nail portion. Then, the regulation by the regulating member is released, so that the errors in the operation of the display mechanism can be prevented.

As has been described above, according to the film pack holder of the present invention, the nail main body, in which one nail member is formed, is supported by a pair of pressing members provided across the center of the nail main body so that the nail main body can be pressed to move back and forth smoothly. Therefore, the lock of the main body of the holder and the lid can be released without fail.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film pack holder comprising:
   a main body of a holder;
   a lid which is attached at the main body of the holder in such a manner to open and close freely and wherein an opening for photographing is formed;
   a film pack at which a slide is attached in such a manner to move back and forth freely and shields sheet film units which are piled to be stored therein from light, when the slide is closed;
   a slide frame which is incorporated in the main body of the holder and is provided in such a manner to move back and forth freely with respect to the main body of the holder, and wherein the film pack is set;
   a nail portion which is provided at the main body of the holder and is engaged with the slide to move when the slide is moved;
   a display mechanism provided at the main body of the holder for indicating that a preparation for photographing is completed in connection with the movement of the nail portion;
   a regulating member which is abutted against the nail portion for regulating the movement of the nail portion; and
   a releasing member which is pushed by the film pack and retracts the regulating member from the nail portion so as to release the regulation by the regulating member when the film pack is set.

2. The film pack holder according to the claim 1 wherein the regulating member is a lock lever in which a stopper abutted against a receiving portion of the nail portion is formed, and the lock lever is positioned at a position, where the movement of the nail portion is regulated, by the force of the torsion spring.

3. The film pack holder according to claim 2 wherein the releasing member has a trigger plate which is pushed by the film pack to move, the lock lever is moved against the force of the torsion spring when the trigger plate is moved, and the stopper piece retracts from the receiving portion of the nail portion.

4. The film pack holder according to claim 3, wherein the trigger plate of the releasing member is positioned at a position, where the movement of the nail portion is regulated, by the force of the torsion spring.

5. The film pack holder according to claim 1, wherein an exposed sheet film unit is discharged from the film pack and is pushed into a bottom portion of the main body of the holder, and is inserted into the lowest layer of the film pack.

6. A film pack holder comprising:
   a main body of a holder into which a film pack housing therein sheet film units is incorporated;
   a lid which is attached on a top surface of the main body of the holder in such a manner to open and close freely and wherein an opening for photographing is formed;
   a pair of nail members which are provided at the main body of the holder and the lid and are engaged with each other when the lid is closed, so as to lock the main body of the holder and the lid;

a nail main body which is arranged at the main body of the holder or the lid in such a manner to move back and forth freely, and in which one of the nail members is formed at both ends thereof;

a pair of biasing members provided on both sides across the center of the nail main body for biasing one nail member in a direction in that the nail member is engaged with the other nail member; and a knob which is provided at the center of the nail main body, and is biased so as to move the nail main body back and forth against the force of the biasing member in a direction in that the engagement of one nail member and the other nail member is released.

7. The film pack holder according to claim 6, wherein a slide frame is provided in the main body of the holder in such a manner to move back and forth freely, the film pack is set in the slide frame, and an exposed sheet film unit is discharged from the film pack and is pushed into a bottom portion of the main body of the holder to be sent into the lowest layer of the film pack.

* * * * *